United States Patent [19]

Miller et al.

[11] Patent Number: 5,498,282

[45] Date of Patent: Mar. 12, 1996

[54] COLOR CHANGING PAN PAINT COMPOSITIONS

[75] Inventors: Richard E. Miller, Nazareth; Robert C. Dereamus, Tatamy, both of Pa.

[73] Assignee: Binney & Smith Inc., Easton, Pa.

[21] Appl. No.: 317,212

[22] Filed: Oct. 3, 1994

Related U.S. Application Data

[63] Continuation-in-part of Ser. No. 270,454, Jul. 5, 1994, Ser. No. 270,485, Jul. 5, 1994, Ser. No. 270,940, Jul. 5, 1994, Ser. No. 270,998, Jul. 5, 1994, and Ser. No. 78,722, Jun. 16, 1993, Pat. No. 5,352,282, which is a continuation of Ser. No. 923,308, Jul. 31, 1992, Pat. No. 5,232,494, said Ser. No. 270,454, Ser. No. 270,485, Ser. No. 270,940, and Ser. No. 270,998, each is a continuation-in-part of Ser. No.89,503, Jul. 16, 1993, Pat. No. 5,326,388, which is a continuation-in-part of Ser. No. 923,308.

[51] Int. Cl.⁶ ..................................................... C09D 11/02
[52] U.S. Cl. ................... 106/22 B; 106/22 F; 106/25 R; 106/26 R
[58] Field of Search .................. 106/22 B, 22 F, 106/25 R, 26 R

[56] References Cited

U.S. PATENT DOCUMENTS

| | | | |
|---|---|---|---|
| 1,550,048 | 8/1925 | Ruben | 401/194 |
| 2,086,745 | 8/1935 | Sell | 106/22 B |
| 2,305,098 | 7/1940 | Minnear | 106/23 B |
| 2,453,201 | 11/1948 | Cushman | 401/207 |
| 2,555,474 | 7/1951 | deVries | 106/22 H |

(List continued on next page.)

FOREIGN PATENT DOCUMENTS

| | | |
|---|---|---|
| 282178 | 2/1988 | European Pat. Off. . |
| 289141 | 3/1988 | European Pat. Off. . |
| 352796 | 7/1989 | European Pat. Off. . |
| 506452 | 3/1992 | European Pat. Off. . |
| 2241653 | 3/1975 | France . |
| 2487372 | 3/1981 | France . |
| 551775 | 5/1927 | Germany . |
| 2724820 | 6/1977 | Germany . |
| 2834459 | 8/1978 | Germany . |
| 2927006 | 7/1979 | Germany . |
| 2927005 | 7/1979 | Germany . |
| 3207217 | 2/1982 | Germany . |
| 59-86672 | 5/1984 | Japan . |
| 59-179572 | 10/1984 | Japan . |
| 62-28834 | 7/1987 | Japan . |
| 1-103676 | 4/1989 | Japan . |
| 3-243673 | 10/1991 | Japan . |
| 1455678 | 1/1975 | United Kingdom . |
| 94/06872 | 9/1992 | WIPO . |

OTHER PUBLICATIONS

Miscellaneous Popping Marker Documents (no date available).
Photocopy of the Packaging Material, Binney & Smith, Inc., Easton, Pa. (1992).
"Color Fibre Pen Inks", BASF Brochure, (1979).

*Primary Examiner*—Helene Klemanski
*Attorney, Agent, or Firm*—Leydig, Voit & Mayer, Ltd.

[57] ABSTRACT

Pan paints and associated color-changing systems are disclosed. In a first embodiment, the color-changing system comprises an undercolor pan paint coloring composition comprising an undercolor dye whose coloring ability is destroyed in the presence of a pH of about 10 or greater and/or in the presence of a reducing agent; and an overcolor composition comprising a colorant capable of maintaining its characteristic color in the presence of a pH of about 10 or greater and/or in the presence of a reducing agent, and a base such that the pH of the overcolor composition is about 10 or greater and/or a reducing agent. In a second embodiment, the color-changing system comprises an undercolor coloring composition comprising an undercolor dye whose coloring ability is destroyed in the presence of a pH of about 4 or less; and an overcolor coloring composition comprising a colorant capable of maintaining its characteristic color in the presence of a pH of about 4 or less and an acid such that the pH of the overcolor coloring composition is about 4 or less; wherein one or both of the coloring compositions is a pan paint.

57 Claims, 3 Drawing Sheets

U.S. PATENT DOCUMENTS

| | | | |
|---|---|---|---|
| 2,559,608 | 11/1948 | Ehrlich | 106/22 A |
| 2,589,306 | 3/1948 | Steiner | 106/22 A |
| 3,221,361 | 12/1965 | Cline | 401/198 |
| 3,400,003 | 8/1966 | Guertin | 106/22 R |
| 3,617,325 | 6/1969 | Spokes et al. | 427/145 |
| 3,627,546 | 12/1971 | Coppeta | 106/21 A |
| 3,672,842 | 6/1972 | Florin | 106/21 A |
| 3,700,603 | 6/1969 | Rembaum | 106/21 A |
| 3,705,045 | 12/1972 | Nadolski | 106/22 D |
| 3,870,435 | 3/1975 | Watanabe et al. | 427/145 |
| 3,873,185 | 3/1975 | Rogers | 430/4 |
| 3,876,496 | 4/1975 | Lozano | 106/21 A |
| 3,886,083 | 5/1975 | Laxer | 106/21 A |
| 3,941,488 | 3/1976 | Maxwell | 401/17 |
| 3,945,836 | 3/1976 | Miyata | 106/22 R |
| 3,945,837 | 3/1976 | Miyata et al. | 106/22 D |
| 3,952,314 | 4/1976 | Maltz | 401/194 |
| 3,957,495 | 5/1976 | Teranishi et al. | 106/19 E |
| 3,966,400 | 6/1976 | Birke et al. | 8/478 |
| 3,979,550 | 9/1976 | Panken | 106/21 R |
| 3,982,251 | 9/1976 | Hochberg | 106/21 A |
| 4,028,118 | 6/1977 | Nakasuji et al. | 106/21 E |
| 4,070,194 | 1/1978 | Arakawa | 106/21 R |
| 4,098,738 | 7/1978 | Buerkley et al. | 106/21 R |
| 4,139,965 | 2/1979 | Curry et al. | 427/333 |
| 4,162,164 | 7/1979 | Lin | 106/21 R |
| 4,171,982 | 10/1979 | Lin | 106/21 A |
| 4,176,361 | 11/1979 | Kawada et al. | 106/20 R |
| 4,193,906 | 3/1980 | Hatanaka | 106/23 B |
| 4,212,676 | 7/1980 | Ueda | 106/19 B |
| 4,213,717 | 7/1980 | Lin | 106/22 B |
| 4,246,033 | 1/1981 | von Wartburg | 106/23 B |
| 4,252,845 | 2/1981 | Griffiths et al. | 106/21 |
| 4,256,494 | 3/1981 | Yamamoto et al. | 106/22 A |
| 4,262,935 | 4/1981 | Anderson et al. | 503/208 |
| 4,352,691 | 10/1982 | Owatari et al. | 106/22 R |
| 4,381,946 | 5/1983 | Uehara et al. | 106/22 K |
| 4,413,266 | 11/1983 | Aviram et al. | 106/22 B |
| 4,428,994 | 1/1984 | Rawlins | 427/260 |
| 4,460,727 | 7/1984 | Shoji | 106/23 R |
| 4,490,177 | 12/1984 | Shioi et al. | 106/22 R |
| 4,505,749 | 3/1985 | Kanekiyo et al. | 106/22 R |
| 4,525,214 | 6/1985 | Panken | 106/19 B |
| 4,525,215 | 6/1985 | Shioi et al. | 106/22 R |
| 4,525,216 | 6/1985 | Nakanishi | 106/23 B |
| 4,557,618 | 12/1985 | Iwata et al. | 106/20 R |
| 4,578,117 | 3/1986 | Nakanishi | 106/20 A |
| 4,604,139 | 8/1986 | Shioi et al. | 106/23 C |
| 4,620,941 | 11/1986 | Yoshikawa et al. | 252/408.1 |
| 4,681,471 | 7/1987 | Hayduchok et al. | 106/22 B |
| 4,708,817 | 11/1987 | Dudnick | 106/22 B |
| 4,725,316 | 2/1988 | Mahany, II | 106/499 |
| 4,732,614 | 3/1988 | Brooks et al. | 106/23 B |
| 4,746,936 | 5/1988 | Takahashi | 401/195 |
| 4,778,525 | 10/1988 | Kobayashi et al. | 106/22 B |
| 4,942,185 | 7/1990 | Inoue et al. | 521/54 |
| 4,954,174 | 9/1990 | Imagawa | 106/27 R |
| 4,954,544 | 9/1990 | Chandaria | 524/111 |
| 4,973,499 | 11/1990 | Iwata et al. | 106/22 R |
| 4,988,123 | 1/1991 | Lin et al. | 106/23 B |
| 5,004,763 | 4/1991 | Imagawa | 523/161 |
| 5,006,171 | 4/1991 | Mecke et al. | 106/20 A |
| 5,009,536 | 4/1991 | Inoue et al. | 106/20 C |
| 5,024,699 | 6/1991 | Llyama et al. | 106/21 R |
| 5,043,013 | 8/1991 | Kluger et al. | 106/20 R |
| 5,082,386 | 1/1992 | Hironaka et al. | 401/206 |
| 5,106,881 | 4/1992 | Inoue et al. | 521/54 |
| 5,118,350 | 6/1992 | Prasad | 106/22 R |
| 5,120,359 | 6/1992 | Uzukawa et al. | 106/20 A |
| 5,176,746 | 1/1993 | Nakanishi et al. | 106/25 R |
| 5,196,237 | 3/1993 | May | 106/19 B |
| 5,196,243 | 3/1993 | Kawashima | 106/21 R |
| 5,203,913 | 4/1993 | Yamamoto et al. | 106/22 B |
| 5,222,823 | 6/1993 | Conforti | 106/22 B |
| 5,232,494 | 8/1993 | Miller | 106/22 B |
| 5,262,535 | 11/1993 | Kaiser | 106/22 B |
| 5,279,859 | 1/1994 | May | 106/19 B |
| 5,302,194 | 4/1994 | Tanabe et al. | 106/21 A |
| 5,320,668 | 6/1994 | Shields et al. | 106/20 R |
| 5,325,282 | 10/1994 | Miller et al. | 106/22 B |
| 5,326,388 | 7/1994 | Miller et al. | 106/22 B |

COLOR CHANGING PAN PAINT COMPOSITIONS

RELATED APPLICATIONS

This application is a continuation-in-part of U.S. patent application Ser. No. 08/078,722, filed Jun. 16, 1993 which will issue as U.S. Pat. No. 5,352,282 on Oct. 4, 1994, which application was a continuation of previous U.S. patent application Ser. No. 07/923,308, filed Jul. 31, 1992 which issued as U.S. Pat. No. 5,232,494 on Aug. 3, 1993. This application also is a continuation-in-part of copending U.S. patent application Ser. Nos. 08/270,454, 08/270,485, 08/270,940, and 08/270,998, all filed Jul. 5, 1994, and all which were continuation-in-part applications of U.S. patent application Ser. No. 08/089,503, filed Jul. 16, 1993 which issued as U.S. Pat. No. 5,326,388 on Jul. 5, 1994 and which was a continuation-in-part of U.S. patent application Ser. No. 07/923,308 filed Jul. 31, 1992 which issued as U.S. Pat. No. 5,232,494 on Aug. 3, 1993.

FIELD OF THE INVENTION

This invention relates generally to the field of coloring compositions and more particularly to a pair of coloring compositions which may be used in conjunction with each other to enable laying down an initial mark using a first undercolor pan paint coloring composition yielding a first color and then using an overcolor coloring composition to enable a change of color of a portion or the entirety of the initial mark.

BACKGROUND OF THE INVENTION

Children enjoy various drawing and coloring activities using a variety of mediums. Useful in such activities are markers containing inks, crayons, pencils of various colors, and various paints including water colors, oil paints, acrylic paints, and pan paints. However, children would often like to change the color of a mark after they have made the mark. One instance would be the desire to add a yellow sun over a previously painted blue sky.

Coloring compositions generally are mixtures of a coloring matter dispersed or dissolved in a carrier. When formulated as pan paints, coloring compositions include a colorant dispersed or dissolved in a water-soluble solid carrier. The colorant, if readily dissolving in a fluid carrier, is termed a dye. An insoluble coloring material is termed a pigment. Pigments are finely ground solid materials and the nature and amount of pigment contained in an ink determines its color.

Pan paints possess a number of advantages over other coloring compositions such as conventional paints, marker inks, and so forth. For example, pan paints have an extraordinarily long shelf life. Because pan paints exist in a solid form, they will not dry out to the point of becoming unusable if exposed to the atmosphere. Moreover, whereas liquid paints may be spilled, pan paints become liquid only in small quantities, and thus are not easily spilled, even by children. In addition, pan paints may be formulated as washable compositions. These features make pan paints especially suitable for use by children.

Changing the color of a mark is not readily done with the typical children's coloring instruments such as those described, nor with typical pan paints. In the past, children changed the marks by placing the mark of one color over the mark of another color. When performing this using traditional pan paints, the marks produced are often not the desired colors, and the tips of the brushes get soiled with the other paints. Further, the colors of traditional children's paints tend to bleed together resulting in undesirable color smears. Therefore, there has been a long felt need for coloring compositions, including pan paints, containing such compositions, which produce marks of a first color that can be readily changed into a wide variety of second colors. Advantageously, a coloring composition should be useful in a coloring system employing both markers and pan paints, to further enhance the play value of the coloring composition for a child. Thus, for example, the user should be able to make a first mark on a substrate using a pan paint, then make a second mark over the first mark using a marker.

In one available marker application, a child is able to change a specific initial mark laid down to a second specific color by applying a reducing agent to the first mark yielding a change in color. The marker inks used in these markers are typically prepared by blending a reducing agent (sometimes termed a bleaching agent) or pH sensitive dye with a dye that is stable in reducing agent or high pH. For example, German Patent Specification No. 2724820, (hereinafter "the German Patent"), concerns the combining of a chemically stable dye and a chemically unstable dye in an ink formulation. Once a mark using this combination of stable and unstable dyes is laid down, the mark may be overwritten with a clear reducing agent solution, eliminating the color contribution of the unstable dye. The resulting mark of the stable dye, with its characteristic color, remains.

There are several drawbacks to such a marking system. First, there are strict limitations on the number of color changes which may be produced. Specifically, in formulations made according to the German Patent, the particular ink composition may only be changed from a first color to a fixed second color. For example, a green mark may only be changed to a violet color as the inks are described in the practice of the German Patent. In addition, since one of the required pair of markers contains only the reducing agent, that reducing agent marker cannot render a visible mark and may only be used in combination with the base color marker. Once the base color marker is used up, the reducing agent marker is of no use. Or, once the reducing agent marker is used up, the base color marker may only be used for the color which it initially marks with. A further disadvantage of the marking process of the German Patent is that the nib of the reducing agent marker tends to get soiled by picking up the colors of the base coloring composition, thus tainting the color of subsequent marks. Further, the compositions disclosed by the German Patent do not possess the advantages inherent in pan paints.

Therefore, an object of the present invention is to provide a coloring composition system which is capable of enhanced multiple color changing abilities.

An additional object of the present invention is to produce a pan paint coloring composition system which includes at least two different pan paint coloring compositions each of which may be used independently or which may be used in combination to provide color changing ability.

An additional object of the present invention is to provide a color-changing coloring system that employs both pan paints and markers.

These and other objects will become apparent to those skilled in the art to which the invention pertains.

SUMMARY OF THE INVENTION

The present invention overcomes the drawbacks associated with prior overwriting coloring compositions in that the particular undercolor coloring composition made according to the invention may be changed to multiple second colors, depending upon the dye present in the overcolor composition. According to the present invention, pan paints may be used in association with color-changing systems including other pan paint compositions and other coloring compositions, such as marker ink compositions. Thus, when the undercolor coloring composition is a pan paint composition, the overcolor coloring composition may be a second pan paint composition, or may be a different coloring composition applied by using a marker. Similarly, when the overcolor coloring composition is a pan paint composition, the undercolor coloring composition may be a second pan paint composition, or may be a different color composition such as a marker ink composition.

Both pan paints and associated color-changing systems fall within the purview of the present invention. In a first embodiment of the present invention, the coloring system utilizes a dye whose coloring ability is destroyed or modified in the presence of high pH and/or a reducing agent. The pan paint composition may serve as the overcolor and/or the undercolor in the first embodiment of the coloring system. In a second embodiment of the present invention, the color-changing effects are produced by utilizing an undercolor dye whose coloring ability is destroyed or modified in the presence of low pH. The pan paint composition may again serve as either the overcolor or the undercolor, or as both.

When the present invention takes the form of a pan paint, either individually or in conjunction with one or more other coloring compositions to thereby form a system, the pan paint comprises a colorant dissolved or dispersed in a water-soluble carrier. Other coloring compositions useful in conjunction with the pan paint compositions are not subject to any particular limitations, and may include, for example, marker inks. Marker inks comprise a colorant dissolved or dispersed in a liquid carrier. Any number of coloring compositions of different varieties may be used in the coloring systems of the present invention, so long as least one of the compositions is a pan paint.

In one embodiment, an undercolor pan paint composition according to the present invention comprises from about 20% to about 99.9% of a water-soluble resin; and from about 0.1% to about 20% of a water-soluble dye selected from the group consisting of (1) dyes whose coloring ability is destroyed or modified in the presence of a pH of about 10 or more; (2) dyes whose coloring ability is destroyed or modified in the presence of a reducing agent; and (3) dyes whose coloring ability is destroyed or modified in the presence of a pH of about 10 or more and in the presence of a reducing agent. This pan paint is suitable as a high-pH undercolor pan paint composition.

In another embodiment, an undercolor pan paint composition according to the present invention comprises from about 20% to about 99.9% of a water-soluble resin; and from about 0.1% to about 20% of a water-soluble dye whose coloring ability is destroyed or modified in the presence of a pH of about 4 or less. This pan paint is suitable as a low-pH undercolor pan paint composition.

In another embodiment, an overcolor pan paint composition according to the present invention comprises from about 20% to about 99.4% of a water-soluble resin; from 0% to about 30% of a pigment; from 0% to about 10% of a base; from 0% to about 20% of a reducing agent, provided that the total amount of base and reducing agent taken together is at least 0.5%; and from 0% to about 20% of a dye whose coloring ability is not destroyed or modified in the presence of a pH of about 10 or more, provided that the total amount of colorant in the pan paint composition is at least 0.1%. This pan paint is suitable as a high-pH overcolor pan paint composition.

In another embodiment, an overcolor pan paint composition according to the present invention comprises from about 20% to about 99.4% of a water-soluble resin; from 0% to about 30% of a pigment; from about 0.5% to about 30% of an acid; and from 0% to about 20% of a dye whose coloring ability is not destroyed or modified in the presence of a pH of about 4 or less, provided that the total amount of colorant in the pan paint composition is at least 0.1%. This pan paint is suitable as a low-pH overcolor pan paint composition.

DETAILED DESCRIPTION OF THE INVENTION

Figure 1:
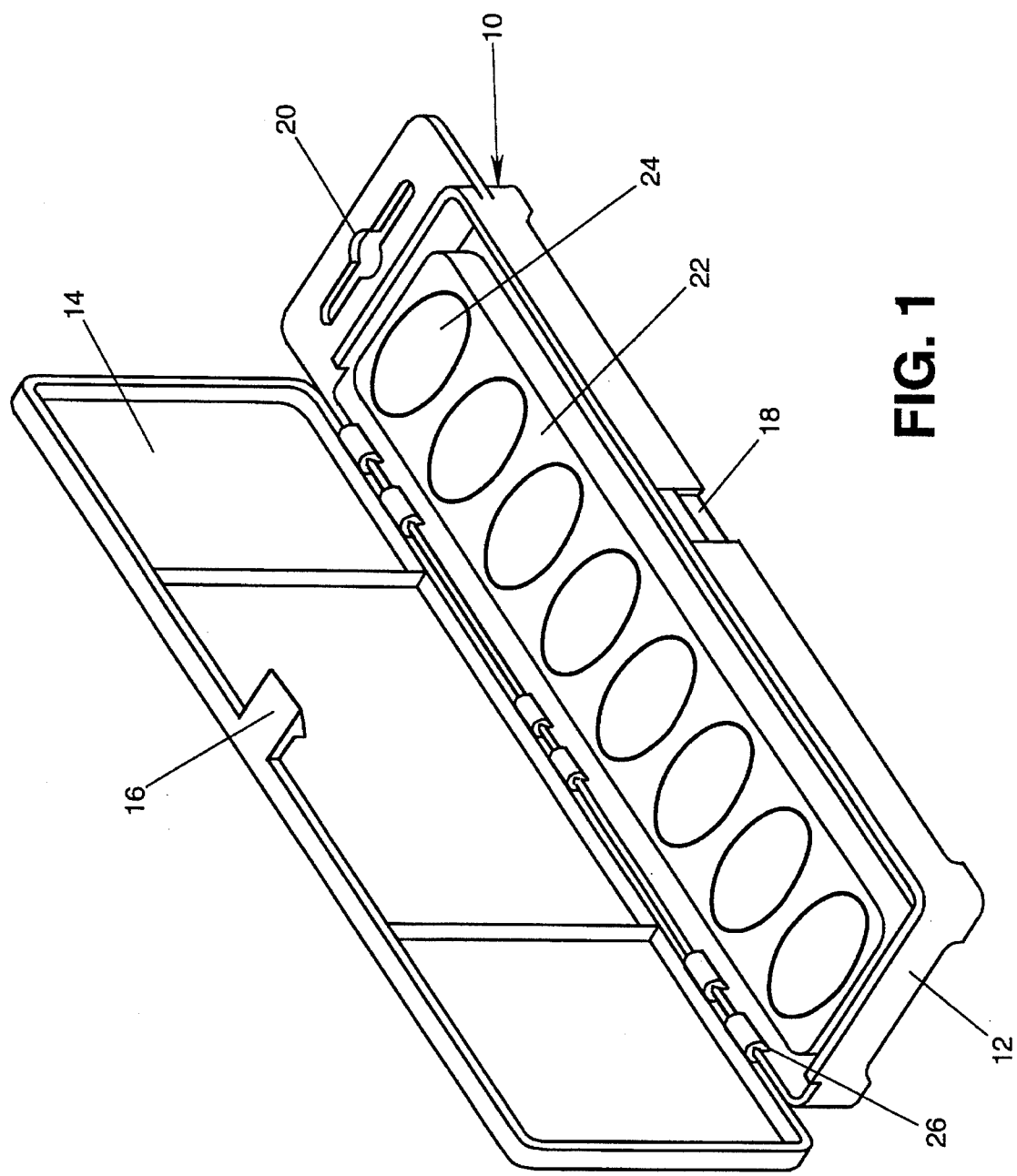
FIG. 1 is a perspective view of a coloring system according to the present invention including multiple pan paints on a pan paint palette in a closeable case.

In general, the present invention includes pan paint compositions and multiple coloring composition systems including at least one pan paint wherein the color of a mark drawn or painted by an undercolor coloring composition onto a substrate may be painted or drawn over by a variety of second colors upon the application of an overcolor coloring composition over the undercolor coloring composition. The present invention imparts the desirable ease of application and convenience of use of traditional color changer systems while avoiding their strict limitations. Therefore, the compositions of the present invention impart improved and convenient coloring properties.

Advantageously, an overcolor pan paint coloring composition of the present invention makes a visible mark, thus it may be used alone or in combination with an undercolor pan paint coloring composition or undercolor marker. Similarly, an undercolor pan paint coloring composition makes a visible mark, thus it may be used alone or in combination with an overcolor paint composition or overcolor marker.

The color-changing effects of the coloring systems of the present invention may be created using a low pH system, otherwise known as an acid-based or acidic system, or a high pH/reducing agent system, also known as a basic system. In either system, the color-changing dye is one whose coloring ability is reversibly or irreversibly destroyed or modified under the specified conditions, i.e., at low pH or at high pH/in the presence of a reducing agent. Additionally, in either system, the overcolor colorant is a colorant whose coloring ability is not destroyed or modified under the specified conditions, i.e., at low pH or at high pH/in the presence of a reducing agent.

In the low pH system, the overcolor composition includes a colorant that is stable under low pH conditions, and an acid sufficient to bring the pH of the overcolor composition in aqueous solution to at least an acidity of about pH 4, preferably about pH 2 to pH 4. The low pH system undercolor composition includes a dye that is unstable at these pH levels. When the low pH systemn overcolor is applied on top of the low pH system undercolor, the low pH of the coloring composition causes the color of undercolor dye to change, such as by becoming colorless.

The high pH/reducing agent system operates in a complementary fashion. In a high pH/reducing agent system, the high pH/reducing agent system undercolor composition includes a dye that is unstable at high pH levels or in the presence of a reducing agent. The high pH/reducing agent system overcolor composition thus contains a colorant that is stable at these conditions, and further contains a base or reducing agent. Preferably, a base is present in an amount sufficient to bring the pH of an aqueous solution of the composition to a pH of about 10 or greater, preferably about pH 10 to pH 12. The high pH/reducing agent system undercolor composition contains one or more dyes whose coloring ability is destroyed or modified at high pH and/or in the presence of a reducing agent.

PAN PAINTS

A high pH/reducing agent system pan paint undercolor composition according to the present invention preferably comprises, by weight, from about 20% to about 99.9% of a water-soluble resin; from 0% to about 40% of a plasticizer or nucleating agent; from 0% to about 15% water; from 0% to about 20% of an opacifier; from 0% to 25% of a filler; from 0% to about 10% of a surfactant; from 0% to about 5% of a preservative; from 0% to about 1% of a defoamer; from 0% to about 30% of a pigment; and from about 0.1% to about 20% of a water-soluble dye selected from the group consisting of dyes whose coloring ability is destroyed or modified in the presence of a pH of about 10 or more; dyes whose coloring ability is destroyed or modified in the presence of a reducing agent; and dyes whose coloring ability is destroyed or modified in the presence of either a pH of about 10 or more and in the presence of a reducing agent.

A low pH system pan paint undercolor composition according to the present invention preferably comprises, by weight, from about 20% to about 99.9% of a water-soluble resin; from 0% to about 40% of a plasticizer or nucleating agent; from 0% to about 15% water; from 0% to about 20% of an opacifier; from 0% to about 25% of a filler; from 0% to about 10% of a surfactant; from 0% to about 5% of a preservative; from 0% to about 30% of a pigment; from 0% to about 5% of a stabilizing base; from 0% to about 1% of a defoamer; and from about 0.1% to about 20% of a water-soluble dye whose coloring ability is destroyed or modified in the presence of a pH of about 4 or less.

A pan paint composition in the high pH/reducing agent system preferably comprises from about 20% to about 99.4% of a water-soluble resin; from 0% to about 40% of a plasticizer or nucleating agent; from 0% to about 15% water; from 0% to about 20% of an opacifier; from 0% to about 25% of a filler; from 0% to about 10% of a surfactant; from 0% to about 5% of a preservative; from 0% to about 1% of a defoamer; from 0% to about 30% of a pigment; from 0% to about 10% of a base; from 0% to about 20% of a reducing agent, provided that the total amount of the base and reducing agent taken together is at least 0.5%; and from 0% to about 20% of a dye whose coloring ability is not destroyed or modified in the presence of a pH of about 10 or more, provided that the total amount of colorant in the pan paint composition is at least 0.1%.

A low pH system overcolor pan paint composition according to the present invention preferably comprises from about 20% to about 99.4% of a water-soluble resin; from 0% to about 40% of a plasticizer or nucleating agent; from 0% to about 15% water; from 0% to about 20% of an opacifier; from 0% to about 25% of a filler; from 0% to about 10% of a surfactant; from 0% to about 5% of a preservative; from 0% to about 30% of a pigment; from about 0.5% to about 30% of an acid; from 0% to about 1% of a defoamer; from about 0.1% to about 3% of an antioxidant; and from 0% to about 20% of a dye whose coloring ability is not destroyed or modified in the presence of a pH of about 4 or less, provided that the total amount of colorant in the pan paint composition is at least 0.1%.

Pan Paint Base

A pan paint comprises a colorant dissolved or dispersed in a water-soluble solid carrier. Optionally, ingredients such as surfactants, surface-enhancing agents such as plasticizers and nucleating agents, opacifiers, fillers, and preservatives such as bactericides and fungicides may be included in the pan paint composition. Surfactants make the pan paint compositions more wettable, thus allowing for easy pick-up by a paint brush. Surface-enhancing agents give the pan paint composition a smooth surface, thereby enhancing the appearance of the pan paint compositions. Opacifiers also enhance the appearance of the pan paint compositions by clarifying the color of the solid pan paint compositions. Fillers, or extenders, reduce the cost of the paint compositions by increasing the weight and size of the pan paint cake. Preservatives prevent spoilage of the pan paint compositions.

The pan paint compositions are solid compositions when distributed to consumers. The term "solid" is intended to encompass semi-solid forms as well as purely solid forms. Of course, when used, the pan paint compositions are liquified upon application of water by the user.

Water may be included in the solid pan paints of the present invention. The water used in the manufacture of the pan paints of the invention is preferably deionized water, and preferably is present in a range from 0% to about 15% by weight after the composition has been prepared and allowed to dry. This amount is in large part determined by the amounts of other components included in the coloring composition. Preferably, the water is present in an amount ranging from about 1% to about 12% by weight of the total composition. If the pan paint is allowed to dry out after it is prepared, the amount of water in the pan paint in solid form will of course become reduced, thus diminishing the appearance of the composition. The dried-out composition still will be useful as a pan paint, however since water may be mixed into the surface of the pan paint by the consumer.

The water-soluble solid carrier comprises a water-soluble resin. Any number of water-soluble resins may be used. It is only necessary that the resin allow the colorant to be uniformly dissolved or dispersed throughout the resin. Preferably, the resin should be nontoxic and odor-free. A large number of resins fit this category, including water-soluble gums and waxes, modified starches, hydroxypropylcellulose, carboxyethylcellulose, hydroxyethylcellulose, polyvinylalcohols, polyvinylpyrrolidines, polyacrylic acids, polyacrylamides, and ethylene oxide polymers. Preferably, polyethylene glycol having a molecular weight of about 4,000 is used as the water-soluble resin. Molecular weights in this application are defined as weight-average molecular weights unless otherwise indicated. Any number of polyethylene glycol resins may be used in the pan paints of the present invention. For example, CARBOWAX 4000™, available from Union Carbide Corp., PLURACOL 4500™, available from BASF Corp., Parsippany, N.J., POLYGLYCOL E-6000™, and POLYGLYCOL E-4000™, available from Dow Chemical Co., Midland, Mich. may be used. POLYGLYCOL E-4000™ has a higher viscosity than CARBOWAX 4000™, and the two may optionally be used together.

The resin may be present in an amount ranging from about 20% to about 99.9% based on the weight of the composition, depending on the other components in the composition. Below levels of about 20%, the resin is less effective as a pan paint base. Preferably, the resin is present in an amount ranging from about 20% to about 90% by weight of the composition.

As colorants in the pan paints of the present invention, dyes, pigments, or other colorants may be used. The pan paint coloring compositions of the present invention contain a colorant in a total amount of at least about 0.1%. The undercolor compositions contain at least one dye that is unstable, i.e., whose coloring ability is reversibly or irreversibly destroyed or modified, in the conditions under which the pan paint composition is designed to be used. Similarly, the overcolor composition contains a colorant that is stable at the specified conditions. For example, a low pH system undercolor composition would contain a dye that is unstable in the presence of a low pH. The low pH system overcolor composition would contain a colorant whose coloring ability is stable in the presence of a low pH. Similarly, a high pH/reducing agent system undercolor composition would contain a dye that is unstable in the presence of a high pH and in the presence of a reducing agent. The high pH/reducing agent system overcolor composition would contain a colorant whose coloring ability is stable in the presence of a high pH and/or in the presence of a reducing agent.

To achieve good coloring of the pan paint coloring compositions in either the low pH system or the high pH/reducing agent system, the minimum concentration of dye which will produce a workable pan paint is governed by the color intensity desired, though as little as 0.1% dye may be sufficient for certain applications. The maximum workable concentration of dye is determined largely by the ability to maintain a stable composition and the depth of color desired and can vary widely depending upon the concentration of other components. It is also a function of the characteristics of the desired end product, though a practical upper limit in the formulation of a pan paint is about 20% by weight. The preferred concentration range for most applications is from about 1% to about 6% dye by weight of the composition. A concentration of about 0.1% to about 4% is even more preferred when the coloring composition is to be used as a pan paint to ensure good coloration. The specific dyes to be used in the pan paints of the present invention are described hereinbelow.

Pigments may further be used as a colorants in the pan paint compositions of the present invention. The undercolor pan paint compositions in either the high pH/reducing agent system or the low pH system may contain a pigment, so long as the undercolor compositions contain at least 0.1% of a color-unstable dye. In addition, the overcolor pan paint compositions of either system may incorporate one or more pigments as colorants. Optionally, one or more pigments may be used in connection with one or more dyes in either a pan paint overcolor composition or a pan paint undercolor composition.

Where the undercolor coloring compositions contain a pigment, interesting coloring effects may be achieved. For example, an undercolor coloring composition may contain a blue pigment and a yellow color-unstable dye. When written or painted over with an overcolor coloring composition containing a red, stable colorant, the mark will turn purple. Other unusual color-changing effects similary may be accomplished using other combinations of dyes and pigment. Similar effects can be achieved using a color stable dye in combination with a color unstable dye in the undercolor coloring composition.

To achieve good coloring of the coloring compositions and to promote compatibility with the remaining ink components, the pigment is utilized in the form of an aqueous dispersion, inasmuch as pigments are by definition insoluble materials. Pigment dispersions are commercially available which are aqueous solutions of a pigment and a surfactant or dispersant system. A pigment dispersion may also be prepared specifically for use in the coloring compositions of the invention. From the standpoint of convenience, a commercial pigment dispersion is preferred for use in the present invention. Typical commercial dispersions contain 30 to 74% by weight active pigment ingredients.

In general, a workable pigment dispersion may have a wide or narrow particle size range depending upon the use to which the dispersion will be put. The lower limit on pigment particle size is determined not by any functional characteristic of the coloring composition, but by the ability to form a stable dispersion. The pigment particles, however, should not be so large as to be visible on the painted substrate. Pigments having a mean particle size range from about 0.05 to about 2.0 microns have been found to work well in marker ink compositions.

In general, the size of pigment particles should be kept as low as possible while maintaining the stability of the composition. An ultra fine pigment dispersion having a mean particle size in the range of from about 0.05 to about 0.5 microns provides acceptable results for the pan paint compositions of the present invention. A more preferred ultra fine pigment dispersion for such applications has a mean particle size in the range from about 0.05 to about 0.25 microns. Examples of suitable pigment dispersions, which are especially suited for compositions of the invention used in the form of an ink include Hostafine Rubine F6B (C.I. Pigment Red 184 dispersion), Blue B2G (Pigment Blue 15-3) and Black 7 (Pigment Black T), marketed by Hoescht Celanese Corporation under the tradename "Hostafines Dispersions".

The minimum concentration of pigment which will produce a workable coloring composition is governed by the color intensity desired, though as little as 0.1% active pigment may be sufficient for certain applications. The maximum workable concentration of pigment is determined largely by the ability to maintain a stable composition, and can vary widely depending upon the concentration of other components. The maximum concentration of pigment usable is also a function of the characteristics of the desired end product, though a practical upper limit in the formulation of the coloring composition used as a pan paint is about 30% by weight since higher concentrations may cause paint instability.

When a commercial pigment dispersion is utilized, as it preferably is, a practical limit is imposed by the concentration of pigment in the dispersion, which, as previously noted, is typically in the range of about 30% to about 74% pigment by the weight of dispersion. The preferred concentration range for most applications is from about 1% to about 10% active pigment by weight of the composition. A concentration of about 3% by weight of active pigment is ordinarily required to ensure good coloration in a typical pan paint and most preferred is a concentration of active pigment in a concentration range of about 0.1% to about 5% by weight of the composition.

To enhance the wettability of the pan paint compositions and to thereby allow for easy pick-up by a paint brush, the pan paint composition preferably includes one or more surfactants. Any number of commercially available surfactants may be used in the pan paints of the present invention. The surfactant should improve the wettability of the ink onto the paint brush without affecting the stability of the pan paint.

Suitable surfactants for use with the pan paint compositions of the invention include TRITON X-405™ (70% octylphenoxypolyethoxy ethanol solution in water), sold by Rohm & Haas Co.; SURFONYL 104 PG-50™; BYK 346™; COLLOID 211™; TAMOL SN™; WITFLO 901™; PLURONIC L-44™; IGEPA™ CO-360 a poly(oxy-1,2-ethanediyl), alpha-(nonylphenyl)-omega-hydroxy-, branched (also known as nonylphenoxypoly(ethyleneoxy-)ethanol, branched) having the general formula $(C_2H_4O)_9C_{15}H_{24}O$, available from GAF, and FLUORAD FC-120™ (2-butoxy ethanol, C9 and C10 ammonium perfluoroalkyl sulfonate solution in water) sold by 3M. Preferably, IGEPAL CO-360 is used as the surfactant.

The surfactant is used in an amount ranging from 0% to about 10%, preferably about 0.1% to about 5%, by weight. At levels above ten percent, the surfactant may interfere with proper formation of the pan paint cake.

To improve the appearance of the pan paint composition, one or more surface-enhancing agents such as plasticizers and nucleating agents may be included in the composition. During formation of the pan paint, the water-soluble resin may crystallize, and, in so doing, may form crystals of an undesirably large size. Thus, a compound such as a nucleating agent may be included in the pan paint composition. It is believed that the nucleating agent increases the rate of crystal growth, thereby resulting in a resin having many small crystals instead of few large crystals. Further, it is believed that plasticizers have the same effect on the crystal growth of the water-soluble resin.

Any suitable compounds may be used as nucleating agents. For example, long-chain alcohols such as stearyl alcohol and cetyl alcohol may be used. Alternately, or in addition thereto, a plasticizer such as a high molecular weight polyethylene glycol or other glycol may be used. It has been observed that PEG 20M, a polyethylene glycol having a molecular weight of about 20,000 and available from Union Carbide, is suitable as a plasticizer. A plasticizer made from a composition of 75% deionized water and 25% PEG 20M has been particularly effective in the pan paint compositions of the present invention. When this plasticizer is used in the absence of stearyl alcohol, the resulting pan paint composition is more effectively washable from surfaces. The nucleating agent and/or plasticizer may be present in a total amount ranging from 0% to about 40% of the pan paint composition, and preferably is present in an amount ranging from about 1% to about 20% by weight. Higher amounts of a plasticizer may adversely affect the appearance of the pan paint cake.

The pan paint compositions of the present invention preferably include an opacifier. An opacifier is essentially a whitener that allows various colors of pan paints in solid form to be readily distinguished. In other words, the opacifier gives each color a brighter or pastel appearance, and allows a user to distinguish one color from another on the palette.

Any suitable ingredient may be used as an opacifier. For example, titanium dioxide, BARYTES, available from Hiltox, and BLANC FIXE, a barium sulfate pigment available from Ewco Chemical Corp., Mt. Kisco, N.Y. may be used as opacifiers. ZEOLEX 23A, a compound available from Huber Corp., Haure de Grace, Md., further may be used as an opacifier. The opacifier is generally used in an amount ranging from 0% to about 20% by weight, and preferably is present in an amount from about 1% to about 10% by weight. Higher amounts of opacifier may adversely affect the color of the pan paint compositions.

Further, the pan paint compositions of the present invention may contain a filler or extender. Typical fillers include talcs, clays and other inexpensive materials. Preferably, NYTAL 300™, a talc mineral mixture available from R. T. Vanderbilt Co., Inc., Norwalk, Conn., and/or Kaolin clay, available from Huber Corp., are used as fillers in the pan paints of the present invention. These compounds are especially suitable for use with the pan paints of the present invention because they further serve as opacifiers. When a filler or extender is used, it may be used in any amount up to about 25%, after which point the quality of the pan paint composition deteriorates.

To assist in formation of the pan paint cake, a defoamer may be included in amounts up to about 1%. Preferably, the defoamer is present in an amount of about 0.5% by weight of the pan paint compositions. The preferred opacifier is Pluracol™ P-2010, available from BASF Corp., Parsippany, N.J.

The pan paint composition may further contain preservatives such as bactericides and fungicides, although the composition preferably omits these ingredients. If a preservative is used, it preferably serves as both a bactericide and a fungicide, and is added in any effective amount, though a typical concentration range is from about 0.1% up to about 5.0% by weight. The use of preservatives in levels greater than about 5% by weight may cause the pan paint composition to become toxic or unstable.

Any conventional preservative may be utilized in the invention as long as there is compatibility with the remaining paint components. For example, preservatives manufactured by Dow Chemical Co. and sold under the trademarks Dowicil™ 75 (1-(3-chloroallyl)-3,5,7-triaza-1-azoniaadamantane chloride) and Dowacil™ 200 (3-chlorovinylhexamethylene tetrammonium chloride) or a preservative manufactured by Rohm and Haas and sold under the trademark Kathon PFM™ (isothiazolinones), or a preservative manufactured by Sutton Labs and sold under the trademark Germall II™ (imazolidinyl urea), or a preservative manufactured by Merck and sold under the trademark Tektamer 38™ (1,2 dibromo-2,4-dicyanobutane), will work in the compositions of the invention. In addition, NUOSEPT 95™ (bicyclic oxazolidines solutions), sold by Hüls America, Inc. and TROYSAN™ POLYPHASE EC-17, sold by Troy Chemical are both suitable preservatives, which may be used alone or in combination.

The method of making the pan paint compositions of the present invention does not vary significantly from presently known methods of formulating pan paints. For example, a heated kettle may be used to melt the water-soluble resin. The colorants and opacifiers are then added, followed by the plasticizers and other ingredients. Subsequently, the molten pan paint composition is poured into the palette, which serves as a mold, and the paint is allowed to cool and harden.

Preferably, the cooling occurs at room temperature, although heat may be applied to speed the drying process.

Figure 2:
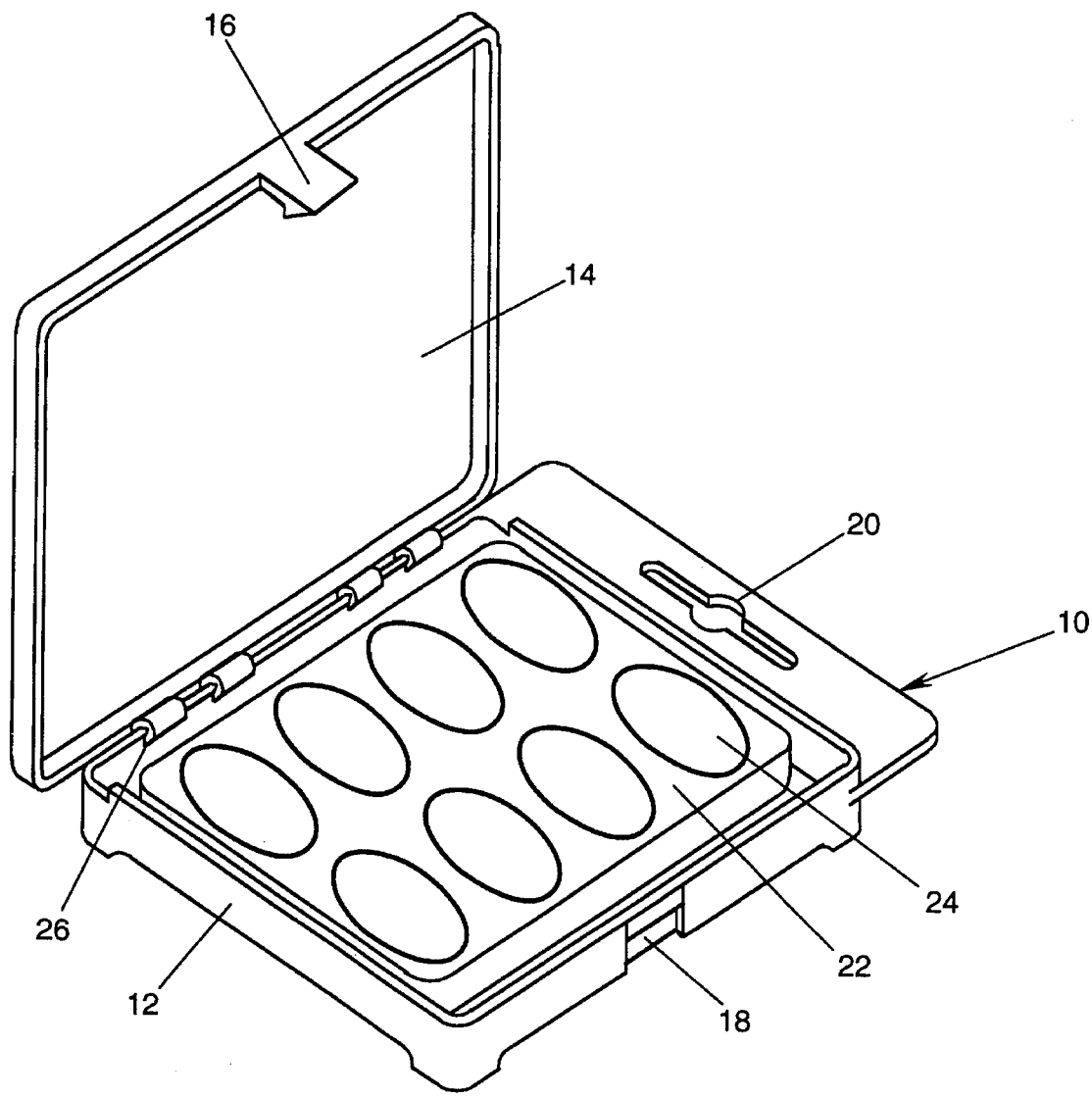
FIG. 2 is a perspective view of a coloring system according to the present invention including multiple pan paints on a pan paint palette in a second closeable case.
Figure 3:
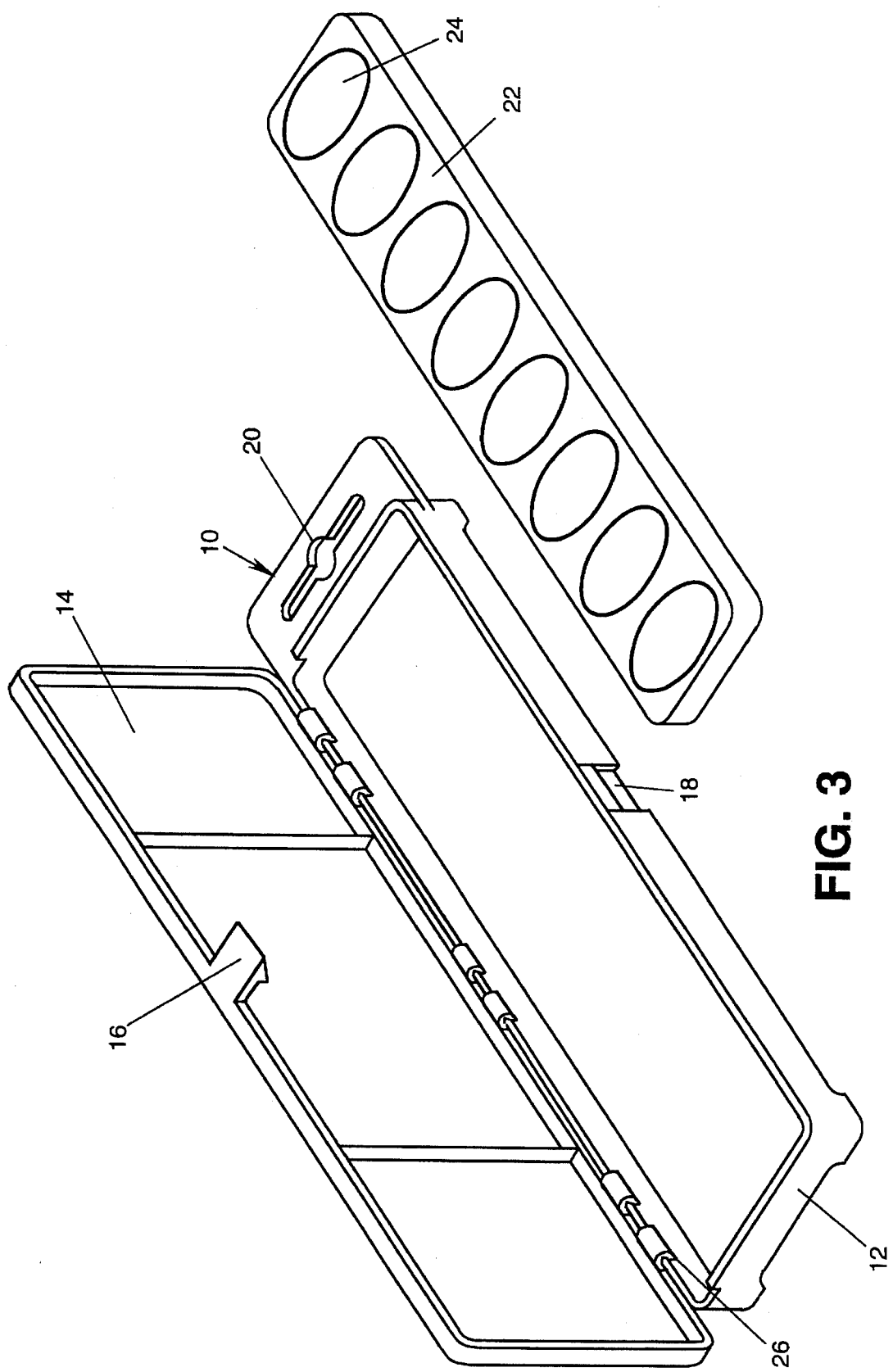
FIG. 3 is an exploded view of a coloring system as illustrated in FIG. 1, illustrating removal of the palette from the closeable case.

The pan paints of the present invention are preferably supplied in a closeable case, as illustrated in the FIGS. With reference to FIGS. 1 and 2, the closeable case 10 comprises a housing 12 including a lid 14 hingeably affixed to the housing 12 by means of hinges 26. A detent 16 fits into a notch 18 to thereby form a releasable latching mechanism for the closeable case. A groove 20 may be provided to allow for hanging display and storage of the closeable case. The pan paints 24 are supplied on a palette 22 located within the closeable case 10. When overwriter and underwriter pan paint coloring compositions are supplied, the palette 22 may have two rows, as illustrated in FIG. 2, to separate the overcolors from the undercolors. FIG. 3 illustrates a pan paint case having a removable palette to allow for more versatility of use.

Low pH System Pan Paint Compositions

Low pH System Pan Paint Undercolor Compositions

The undercolor low pH system pan paint compositions of the present invention contain a low-pH-sensitive dye in an amount of at least 0.1%, and may optionally contain a pigment. Suitable colorants for use in the low pH system undercolor compositions include dyes that become unstable at low pH. Such dyes include dyes which are easily destroyed or modified in the presence of a pH of about 4 or less. Such coloring compositions are commonly known in the field and are occasionally used as chemically "erasable" inks.

Especially suitable for use as dyes in the undercolor coloring composition are xanthene dyes, pthalocyanine dyes, and azo dyes which are unstable in the presence of a pH of about 4 or less. Dyes which have been found to meet these criteria include Acid Red 92 marketed by International Dyestuffs Corporation, Acid Yellow 1 marketed by International Dyestuffs, PYRANINE 120™ marketed by Miles-(Mobay), and mixtures thereof.

The low pH system pan paint undercolor compositions may contain a stabilizing base in addition to the above described general pan paint composition. The base should be present in an amount such that an aqueous solution of the pan paint composition has a pH of from about 7.0 to about 8.5, thereby stabilizing the colorant in the undercolor pan paint composition. Typical stabilizing bases which may be employed in the undercolor pan paint composition include sodium acetate, sodium carbonate, and monosodium EDTA. The stabilizing base should be present in an amount ranging from 0% to about 5%. Higher amounts of base may hinder the color-changing ability of the undercolor pan paint composition.

Low pH System Undercolor Pan Paint Compositions

The paints of Examples 1 and 2 are formulated as follows.

|  | Example 1 Red Paint % | Example 2 Yellow Paint % |
| --- | --- | --- |
| Component |  |  |
| Water | 9.00 | 9.00 |
| PEG 4500 | 82.00 | 82.00 |
| PEG 20M | 4.50 | 4.50 |
| Colorant |  |  |
| Red Premix | 4.50 | — |
| Yellow Premix | — | 4.50 |

The above percentages are by weight of the total composition. In Examples 1 and 2, Red Premix is a composition comprising 35% $TiO_2$ and 65% Acid Red 92. Yellow Premix is a composition comprising 35% $TiO_2$ and 65% Acid Yellow 1.

Each paint is formulated as follows. Thirty percent of the PEG 4500 is mixed with water. To this mixture is added the dye premix, and the combined mixture is stirred for fifteen minutes. The remainder of the PEG 4500 and the PEG 20M are then added. The composition is stirred for ten minutes, poured into a pan, and allowed to solidify at room temperature.

Low pH System Pan Paint Overcolor Compositions

When a low pH system is desired, the pan paint overcolor includes an acid such that the pH of an aqueous solution of the overcolor pan paint composition is about 4 or less, preferably about pH 2 to about pH 4, in addition to the above described general pan paint components. Acids which may be used in the overcolor pan paint compositions are typically strong acids. Such acids include, for example, phosphoric acid, sulfuric acid, and citric acid. Preferably, phosphoric acid is used. The acid is generally present in an amount ranging from about 0.5% to about 30% by weight of the total composition. At minimum, the acid should be present in an amount sufficient to effect a color change of the undercolor composition. The maximum amount of acid is determined by the stability of the composition and by the toxicity of the composition. The preferred amount of acid depends on the particular acid employed, and in any event is controlled by the desired pH of the solubilized pan paint.

Dyes that are stable at low pH are suitable as overcolor dyes in the low pH overcolor pan paint compositions of the present invention. Such dyes include polymethine dyes, triphenylmethane dyes, cyanine dyes, methine dyes, and azo dyes which are stable in the presence of a pH of about 4 or less. Examples of such dyes include the dyes marketed under the tradenames Acid Green 3 by International Dyestuffs Corporation, Acid Blue 93 and Acid Violet 19 marketed by Spectra Color Corporation, Acid Yellow 23 marketed by Crompton & Knowles, and mixtures thereof. Acid Green 3 and Acid Violet 19 are azo dyes, and are characterized by the presence of one or more —N=N— (azo) groups. Acid Green 3 is commonly used in making pulp colors or lakes. Acid Violet dyes are primarily fashion colors.

Polymethine dyes are colored substances in which a series of —CH= (methine) groups connect to terminal groups of a chromophore. Polymethine and cyanine are often used interchangeably as generic terms for all polymethine dyes. The previous primary usage for polymethine dyes are dying acetate rayon as well as polyacrylinitrile and polyacrylamide. Acid Red dyes, classified as xanthene dyes, are generally used as colorants for foods, drugs, and cosmetics. Specifically, Acid Red 92, the disodium salt of 2,4,5,7- tetrabromo-9-3,4,5,6, tetrachloro-o-carboxylphenyl)-6-hydroxy-3-isoxanthone, is called D & C Red No. 28 by the FDA, and sold under the tradename Phloxine B.

The overcolor low pH system pan paint compositions may further contain an antioxidant. Typical antioxidants for use in the pan paint overcolor compositions include citric acid, ascorbic acid, sodium hypophosphite, and phosphoric acid. Preferably, citric acid is used. The antioxidant is preferably present in an amount ranging from about 0.1% to about 3% by weight of the composition.

Low pH System Overcolor Pan Paint Compositions

The paints of examples 3–5 are formulated as follows.

|  | Example 3 Blue Paint % | Example 4 Yellow Paint % | Example 5 Green Paint % |
| --- | --- | --- | --- |
| Component |  |  |  |
| PEG 4500 | 65.00 | 65.00 | 65.00 |
| Pluracol P-2010 | 5.50 | 5.50 | 5.50 |
| Stearyl Alcohol | 6.50 | 6.50 | 6.50 |
| Water | 1.50 | 1.50 | 1.50 |
| Carbowax 20000 | 3.00 | 3.00 | 3.00 |
| Igepal CO-630 | 0.50 | 0.50 | 0.50 |
| Citric Acid | 8.00 | 8.00 | 8.00 |
| Colorant |  |  |  |
| Acid Blue 93 | 10.00 | — | — |
| Acid Yellow 23 | — | 10.00 | — |
| Acid Green 3 | — | — | 10.00 |

The above percentages are by weight of the total composition. The pan paints are prepared in a fashion similar to the preparation process described in the previous Examples.

High pH/Reducing Agent System Pan Paint Compositions

It has been observed that pan paints incorporating a reducing agent and/or a base may be difficult to stabilize. In addition, such pan paints present potential toxicity concerns as compared to pan paints containing an acid or to those not containing any pH-modifying agent. Thus, while such a pan paint falls within the scope of the present invention, it is preferred that such a pan paint not be used where the consumer is a child. In the preferred embodiments of the present invention, the coloring system does not include a pan paint having a base and/or a reducing agent. Of course, these concerns do not apply to high pH/reducing agent system pan paint undercolor compositions. These compositions contain a dye whose coloring ability is destroyed or modified in the presence of a pH of about 10 or greater and/or a reducing agent, and preferably do not contain a base or a reducing agent. Therefore, this embodiment of the present invention does not fall outside the scope of the preferred embodiments. In the high pH/reducing agent system, therefore, the overcolor composition preferably is a marker ink or other coloring composition.

High pH/Reducing Agent System Pan Paint Undercolor Compositions

The undercolor high pH/reducing agent system pan paint compositions are formulated with a pan paint base including one or more dyes that are color-unstable at high pH and/or in the presence of a reducing agent. The undercolor dye comprises a dye whose coloring ability is reversibly or irreversibly destroyed or modified in the presence of high pH and/or in the presence of a reducing agent. Most suitable for use as dyes in the undercolor pan paint coloring compositions are dyes that are easily destroyed by reducing agent. Such coloring compositions are commonly known in the field and are occasionally used as chemically "erasable" inks. Also suitable for use as dyes in the undercolor pan paint coloring compositions are dyes which are easily destroyed in the presence of a pH of about 10 or greater.

Especially suitable for use as dyes in the undercolor pan paint coloring composition are polymethine dyes, triphenylmethane dyes, cyanine dyes, methine dyes, and azo dyes which are unstable in the presence of a pH of about 10 or greater and/or are unstable in the presence of a reducing agent. Such dyes include the dyes marketed under the tradenames BASACRYL X-RL YELLOW™ (Basic Yellow 49), marketed by the BASF Corporation, ASTRAZON BLUE FRR™ (Basic Blue 69), ASTRAZON BRILLIANT RED 4G™ (Basic Red 14), and ASTRAZON PINK FBB™ (Basic Red 49) by Miles(Mobay); and the dyes marketed under the tradenames Acid Green 3 by International Dyestuffs Corporation, Acid Blue 93 and Acid Violet 19 marketed by Spectra Color Corporation as well as mixtures thereof. The listed ASTRAZON dyes are classified as polymethine dyes. In addition, dyes such as PALMER BLUE, available from Milliken Chemical, Inman, S.C., may be used as undercolor dyes. PALMER BLUE changes from blue to yellow at high pH, thereby allowing for interesting color-changing effects when written or printed over with a high pH/reducing agent system overcolor coloring composition. In addition, ACID BLUE 93, Basic Red 16, and Basic Yellow 49 may be used as dyes in the high pH/reducing agent system pan paint undercolor compositions.

| High pH/Reducing Agent System Pan Paint Undercolor Composition Examples | |
| --- | --- |
|  | Example 6 Magenta paint % |
| Component |  |
| Polyglycol E-4000 | 63.05 |
| Stearyl Alcohol | 2.96 |
| Igepal CO-630 | 0.20 |
| Plasticizer | 5.73 |
| Colorant |  |
| Water | 27.35 |
| Acid Violet 19 | 0.70 |

The above percentages are by weight of the total compositions. In example 6, the plasticizer comprised 75% water and 25% PEG 20M. The pan paint cake was prepared in a fashion similar to the process of preparation described in previous Examples, but was dried at 140° F. for several hours to drive off excess water.

The pan paints of examples 7–9 are similarly prepared.

|  | Example 7 Blue paint % | Example 8 Red paint % | Example 9 Yellow paint % |
| --- | --- | --- | --- |
| Component |  |  |  |
| Polyethlene glycol (MW = 4500) | 77.90 | 77.90 | 77.90 |
| PEG 20M | 4.30 | 4.30 | 4.30 |

-continued

|  | Example 7 Blue paint % | Example 8 Red paint % | Example 9 Yellow paint % |
|---|---|---|---|
| Water | 7.80 | 7.80 | 7.80 |
| Colorant |  |  |  |
| Acid Blue 93 | 10.00 | — | — |
| Basic Red 16 | — | 10.00 | — |
| Basic Yellow 49 | — | — | 10.00 |

The above percentages are by weight of the total compositions.

High pH/Reducing Agent System Pan Paint Overcolor Compositions

When a high pH/reducing agent system is desired, the overcolor pan paint coloring composition of the present invention is formulated by combining a reducing agent and/or a base with a colorant which maintains its characteristic color in the presence of reducing agent and in the presence of a reducing agent and/or in high pH conditions in addition to the above described general pan paint components. Preferably, a reducing agent and a base are included in the high pH/reducing agent system pan paint overcolor compositions.

Typical reducing agents for use in the overcolor pan paint coloring composition of the invention include hydrogen sulfide, sodium sulfite, sodium hypochlorite, and sodium bisulfite. The preferred reducing agent for use in the overcolor pan paint coloring composition of the invention is $Na_2SO_3$ (sodium sulfite). When used, the reducing agent is generally present in the overcolor pan paint coloring composition of the invention in an amount from about 0.5% to about 20% with a minimal amount required to allow for the elimination of the undercolor pan paint coloring composition of the invention and the maximum amount determined by the stability of the composition and the safety of the composition for use by children. Preferably, the reducing agent is contained in the overcolor pan paint coloring composition in an amount from about 5% to about 15%, and most preferably in an amount from about 8% to about 12% by weight of the overcolor pan paint coloring composition.

Overcolor pan paint coloring compositions of the invention may be formulated using only a reducing agent. However, the reducing agents used in overcolor pan paint coloring compositions of the invention perform most effectively in the presence of an elevated pH. To elevate the pH of the overcolor pan paint coloring composition, a base is added. Bases which may be used in the overcolor pan paint coloring composition of the invention are typically strong bases. Such bases include, for example, ammonium hydroxide, sodium hydroxide, and sodium carbonate. The preferred base is sodium hydroxide.

When used, the base is generally present in the overcolor pan paint coloring composition of the invention in an amount from about 0.5% to about 10% by weight. Preferably, the base is added in an amount sufficient to raise the pH of the composition to a pH of from about 10 to about 12. The base is preferably contained in the overcolor pan paint coloring composition in an amount of from about 0.5% to about 8%, and most preferably from about 1% to about 5% by weight of the overcolor pan paint coloring composition.

Where colorants used in the high pH/reducing agent system undercolor pan paint composition are only affected by a reducing agent, the base may be omitted. Also, where dyes used in the undercolor pan paint composition are only affected by an elevated pH, the reducing agent may be eliminated. However, for maximum commercial application and for maximum effect upon a wider variety of undercolor pan paint coloring compositions, the overcolor composition is preferably formulated with a reducing agent and base in combination. To function as an overcolor, however, the overcolor pan paint composition should be formulated such that the total amount of base and reducing agent taken together is at least about 0.5%.

Dyes to be used in the overcolor pan paint coloring composition must be highly resistant to chemical attack such as from a reducing agent or high pH conditions. Dyes meeting this criteria include xanthene dyes, pthalocyanine dyes, and azo dyes which are stable in the presence of a pH of about 10 or greater and/or are stable in the presence of a reducing agent. Dyes which have been found to meet these criteria include PYRANINE 120™ marketed by Miles-(Mobay), Acid Red 52 marketed by Carolina Color, Food Red 14 marketed by Hilton-Davis, BASANTOL GREEN 910™ marketed by BASF, Acid Red 87 marketed by Hilton-Davis, Acid Red 92 marketed by International Dyestuffs Corporation, Acid Red 388 and Direct Blue 199 marketed by Crompton & Knowles, and mixtures thereof.

Acid Red 87 is also called D & C Red No. 22 by the Food and Drug Administration ("FDA"), and sold under the tradenames Eosine YS and Eosine G. Acid Red 52 is a colorant for plastics. Further, Food Red 14 or FD&C Red No. 3, commercially available under the tradenames Erythrosine and Erythrosine Bluish, is the disodium salt of 9(o-carboxyphenyl)-6-hydroxy-2,4,5,7-tetraiodo-3H-xanthen-3-one, which contains smaller amounts of lower iodinated fluoresceins.

High pH/Reducing Agent System Pan Paint Overcolor Composition Examples

| Component | Example 10 Yellow paint % |
|---|---|
| Polyglycol E-4000 | 63.05 |
| Stearyl Alcohol | 2.96 |
| Igepal CO-630 | 0.20 |
| Plasticizer | 5.73 |
| Coloring Solution |  |
| Water | 21.03 |
| Sodium Sulfite | 2.80 |
| Pyranine 120 | 0.42 |
| Sodium Hydroxide | 2.80 |

The above percentages are by weight of the total composition. In example 10, the plasticizer comprised 75% water and 25% PEG 20M. The cake was formed and dried at 140° for several hours. The cooled cake performed fairly.

The pan paints of Examples 11–13 are similarly prepared.

| Component | Example 11 Yellow paint % | Example 12 Green paint % | Example 13 Red paint % |
|---|---|---|---|
| Polyglycol E-4000 | 60.00 | 60.00 | 60.00 |
| Stearyl Alcohol | 4.00 | 4.00 | 4.00 |

-continued

|  | Example 11 Yellow paint % | Example 12 Green paint % | Example 13 Red paint % |
|---|---|---|---|
| T-Clay | 24.00 | 24.00 | 24.00 |
| Pluracol P-2010 | 0.20 | 0.20 | 0.20 |
| Plasticizer | 5.00 | 5.00 | 5.00 |
| Sodium Sulfite | 2.50 | 2.50 | 2.50 |
| Sodium Hydroxide | 2.50 | 2.50 | 2.50 |
| Colorant |  |  |  |
| Pyranine 120 | 1.80 | — | — |
| Basantol Green 910 | — | 1.80 | — |
| Acid Red 87 | — | — | 1.80 |

The above percentages are by weight of the total compositions. The plasticizer of examples 11–13 comprises 75% water and 25% PEG 20M.

MARKER INKS

Marker Ink Base

In conjunction with the pan paints of the present invention, a marker ink may be used to thereby form a coloring system. Marker inks comprise a colorant dissolved or dispersed in a liquid carrier, and may also optionally include such ingredients as humectants, preservatives, bittering agents, and drying agents. Humectants function to improve freeze/thaw stability and to control drying out of the tip when the coloring composition is used as a marker ink. Preservatives, such as biocides and fungicides, serve the obvious function of preventing spoilage of the ink during the expected shelf life of the marker product. Drying agents speed drying of a mark laid down by a marker. Bittering agents impart the marker ink with a bitter taste, so as to prevent children and animals from ingesting the ink.

The water used in the marker inks of the invention is preferably deionized water. The amount of water present in coloring compositions is typically from about 10% to about 90% and this amount is in large part determined by the amounts of other components included in the coloring composition. To achieve a desirable viscosity when the coloring composition is used in the form of an ink, water is preferably present in an amount of from about 20% to about 80%, and most preferably from about 45% to about 60% by weight of the coloring composition.

As a colorant in the marker inks of either the low pH system or the high pH/reducing agent system, a dye, pigment, or other colorant may be used. The undercolor marker inks contain at least one color-unstable dye, and may include other colorants. The overcolor compositions contain at least one color-stable colorant. Both the undercolor and overcolor compositions useful in either system should include a colorant in an amount of at least about 0.1%. The specific pH- and reducing-agent-sensitive dyes useful in attaining the color changing effects are identical to those useful in the pan paint compositions of the present invention and have previously been set forth.

As a general matter, to achieve good coloring of the marker ink coloring compositions, the minimum concentration of dye which will produce a workable ink is governed by the color intensity desired, though as little as 0.1% dye may be sufficient for certain applications. The maximum workable concentration of dye is determined largely by the ability to maintain a stable composition and the depth of color desired and can vary widely depending upon the concentration of other components. It is also a function of the characteristics of the desired end product, though a practical upper limit in the formulation of a marker ink is about 15% by weight. The preferred concentration range for most applications is from about 1% to about 6% dye by weight of the composition. A concentration of about 1.5% to about 4% is even more preferred when the coloring composition is to be used as an ink for a typical marker to ensure good coloration.

Pigments may further be used as a excellent colorants in the marker ink coloring compositions suitable for use in the coloring systems of the present invention. In general, a workable pigment dispersion may have a wide or narrow particle size range depending upon the use to which the ink will be put. The lower limit on pigment particle size is determined not by any functional characteristic of the coloring composition, but by the ability to form a stable dispersion. Similarly, the upper limit on pigment particle size is determined by the type of applicator by which the coloring composition is to be applied or dispensed, since pigment particle size determines the ability of pigment particles to flow through, for example, the matrix of a marker nib where the coloring composition is in the form of an ink.

Indeed, relatively larger pigment particles can restrict ink flow through many types of nibs commonly utilized in writing and marking instruments, ultimately rendering them inoperable. Larger particle sizes may, however, may be used where the coloring composition is to be used in, for example, a paint marker, in which the composition is dispensed through a valve assembly, or in a roller ball pen or where there composition is used in the form of a paint and a brush is used to distribute the coloring composition. Pigments having a mean particle size range from about 0.05 to about 2.0 microns have been found to work well in marker ink compositions.

In choosing the most suitable pigment particle size when coloring compositions of the invention are to be used in the form of an ink, one must be guided by the particular nib type to be utilized in the writing or marking instrument in which the ink will be placed. Of course, a pigment particle size must be selected which will allow the passage of the composition through the nib being used. Further, the pigment particle size should be selected to promote capillary flow through the particular nib being used in the writing or marking instrument. In general, the size of pigment particles should be kept as low as possible while maintaining the stability of the composition. For example, it has been found that an ink to be utilized in a marking instrument having either a porous plastic nib or a bonded fiber nib, an ultra fine pigment dispersion having a mean particle size in the range of from about 0.05 to about 0.5 microns provides acceptable results. A more preferred ultra fine pigment dispersion for such applications has a mean particle size in the range from about 0.05 to about 0.25 microns, since such a dispersion promotes better wicking or capillary flow through the nib. Examples of suitable pigment dispersions, which are especially suited for compositions of the invention used in the form of an ink include Hostafine Rubine F6B (C.I. Pigment Red 184 dispersion), Blue B2G (Pigment Blue 15-3) and Black 7 (Pigment Black T), marketed by Hoescht Celanese Corporation under the tradename "Hostafines Dispersions".

The minimum concentration of pigment which will produce a workable coloring composition is governed by the color intensity desired, though as little as 0.1% active pigment may be sufficient for certain applications. The maximum workable concentration of pigment is determined largely by the ability to maintain a stable composition, and can vary widely depending upon the concentration of other components. The maximum concentration of pigment usable is also a function of the characteristics of the desired end product, though a practical upper limit in the formulation of the coloring composition used, for example, as a marker ink, is about 30% by weight since higher concentrations may cause ink instability and undesirably high viscosity.

When a commercial pigment dispersion is utilized, as it preferably is, a practical limit is imposed by the concentration of pigment in the dispersion, which, as previously noted, is typically in the range of about 30% to 74% pigment by the weight of dispersion. The preferred concentration range for most applications is from about 1% to about 10% active pigment by weight of the composition. A concentration of about 3% by weight of active pigment is ordinarily required to ensure good coloration in a typical marker ink and most preferred is a concentration of active pigment in a concentration range of about 1.5% to about 5% by weight of the composition.

The marker inks useful in the coloring systems of the present invention further may include a humectant. Addition of a humectant ensures that marker inks do not prematurely dry in a capillary marking system, such as a bonded fiber marking nib. Typical humectants which may be employed in the coloring compositions of the present invention include polyhydric alcohols such as ethylene glycol, propylene glycol, hexylene glycol and poly(ethylene glycol), and hydroxylated starches. The humectant is preferably glycerin.

The humectant is generally used in an amount of from 0% to about 30% by weight of the composition, though this range is by no means critical. The amount of humectant to be added is determined by the type of nib used in the writing or marking instrument to be employed and the protection time period desired. In one preferred composition, the humectant, glycerin, is added in an amount of from about 15% to about 25% by weight of the coloring composition.

To achieve a more rapid drying rate and to improve marking characteristics upon nonporous materials, a drying agent may be added to increase the overall volatility and therefore the evaporation rate of the water and the pH regulant. Any compatible material which performs this function may be used.

The drying agent preferably should be a volatile polar material so as to ensure compatibility with the primary components of the marker ink. Straight chain C2–C4 alcohols are good, highly volatile drying agents, and of these, ethanol is preferred because of its relatively low cost and because it does not contribute any unpleasant odor to the composition. Alcohols can also provide added benefits, such as reducing surface tension, increasing adherence of the ink to porous surfaces, and providing bactericidal activity when added to the ink composition.

To discourage improper usage of the marker ink, such as ingesting the ink, the coloring composition may contain a bittering agent or a conventional denaturant. An alcohol utilizing a bittering agent will discourage such improper usage of the ink by simply imparting a disagreeable taste, while not requiring the use of toxic denaturants as methanol or benzene, and is therefore preferred. A conventional denatured alcohol may, of course, also be utilized. The most preferred drying agent is an ethyl alcohol which contains a bittering agent and which is sold under the trade name SDA 40B, manufactured by Aaper Alcohol.

When utilized, the drying agent preferably is added from about 5% up to about 30% by weight, with the most preferred concentration being about 8–10% by weight, though these amounts are not critical to the practice of the invention. About 8% per weight of drying agent is ordinarily required to ensure rapid drying of the ink on a nonporous surface, while amounts in excess of about 30% by weight may adversely affect stability of the ink and may cause flocculation of the pigment unless other stabilizing additives are employed.

To maintain the shelf life of the composition, a preservative may be added. The preservative preferably serves as both a bactericide and a fungicide, and is added in any effective amount, though a typical concentration range is from about 0.1% up to about 5.0% by weight. The use of preservatives in levels greater than about 5% by weight may cause the ink to become toxic or unstable and may, in any event, be unnecessary. Should alcohol be added to the composition as a drying agent, the alcohol will function as a preservative to some extent also.

Any conventional preservative may be utilized in the invention as long as there is compatibility with the remaining ink components. For example, preservatives manufactured by Dow Chemical Co. and sold under the trademarks Dowicil 75 (1-(3-chloroallyl)-3,5,7-triaza-1-azoniaadamantane chloride) and Dowicil 200 (3-chlorovinylhexamethylene-tetrammonium chloride) or a preservative manufactured by Rohm and Haas and sold under the trademark Kathon PFM (isothiazolinones), or a preservative manufactured by Sutton Labs and sold under the trademark Germall II (imazolidinyl urea), or a preservative manufactured by Merck and sold under the trademark Tektamer 38 (1,2dibromo-2, 4-dicyanobutane), will work in the composition of the invention.

Other acceptable preservatives include TROYSAN POLYPHASE P100™, a 3-Iodo-2-Propynyl Butyl Carbamate sold by Troy Chemical solubilized with PVP K-30™, a 2-Pyrrolidinone, 1-Ethenyl-, Homopolymer solubilizer $((C_6MgNO)_x$ sold by ISP Technologies Inc., and M-PYROL™, a 1-Methyl-Pyrrolidinone solubilizer sold by GAF Chemicals Corporation. Addition of preservatives to the coloring compositions inhibits the growth of bacteria and fungi in water-based products.

Preferably, the inks are placed in conventional markers using such nibs as bonded fiber or sintered plastic. Preferably, various undercolor coloring compositions are placed in an undercolor set of markers, each containing an appropriate different color dye. Various overcolor coloring compositions of the invention are then placed in a second group of markers, each of these compositions containing an appropriate different colorant, either a dye or pigment.

Low pH System Marker Inks

Low pH System Marker Ink Undercolors

When using a low pH system, the undercolor marker ink contains at least one dye that is unstable at low pH, and may contain other colorants. The undercolor marker ink coloring composition may also contain a stabilizing base. The stabilizing base comprises a base which keeps the undercolor marker ink coloring composition at a pH of from about 7.0 to about 8.5. At the elevated pH, the colorant in the undercolor marker ink coloring composition remains stable after it is applied to a substrate. The undercolor marker ink colorant will not be destroyed until the overcolor coloring composition is applied over the undercolor marker ink coloring composition.

Typical stabilizing bases which may be employed in the undercolor marker ink coloring composition include sodium hydroxide, sodium carbonate, and monosodium EDTA. The stabilizing base is usually present in the undercolor marker ink coloring composition in an amount of from about 0.2% to about 2% by weight of the composition.

Low pH System Undercolor Marker Ink Examples

| Component | Example 14 Red Ink % | Example 15 Yellow Ink % |
|---|---|---|
| Deionized Water | 74.00 | 74.00 |
| Glycerin | 20.00 | 20.00 |
| Preservative | | |
| Nuosept 95 | 0.50 | 0.50 |
| premix | 2.50 | 2.50 |
| Dye | | |
| Acid Red 92 | 3.00 | — |
| Acid Yellow 1 | — | 3.00 |

| Component | Example 16 Orange Ink % | Example 17 Coral Ink % |
|---|---|---|
| Deionized Water | 74.50 | 74.50 |
| Glycerin | 20.00 | 20.00 |
| Preservatives | | |
| Nuosept 95 | 0.50 | 0.50 |
| premix | 2.50 | 2.50 |
| Dye | | |
| Acid Red 92 | 0.50 | 2.00 |
| Acid Yellow 1 | 2.00 | — |
| Pyranine 120 | — | 1.00 |
| NaOH (5N soln) | — | 0.50 |

The above percentages are by weight of the total compositions. "Premix" in the previous and following examples was a mixture of 96.04% M-PYROL, 1.98% PVP K30, and 1.98% TROYSAN POLYPHASE P-100. The inks of examples 14–17 had acceptable working properties. The pH of these inks ranged from 7.5 to 9.0 and the density ranged from 8.8 to 9.1 pounds per gallon. Further, the viscosity ranged from 2.5 to 3.8 centipoise.

Low pH System Marker Ink Overcolors

Overcolor marker inks include at least one colorant that is stable at low pH and an acid sufficient to bring the pH of the overcolor marker ink to about pH 4, preferably about pH 2 to pH 4. Acids which may be used in the overcolor coloring composition are typically strong acids. Such acids include, for example, phosphoric acid, sulfuric acid, and citric acid. The preferred acid for use in the overcolor coloring composition of the invention is phosphoric acid. Acid is generally present in the overcolor coloring composition of the invention in an amount from about 0.5% to about 30% with a minimal amount required to allow for the erasing of the undercolor coloring composition of the invention and the maximum amount determined by the stability of the composition and the safety of the composition for use by children. Preferably, the acid added in an amount sufficient to lower the pH of the overcolor coloring composition to a pH of from about 2 to about 4, and is contained in the overcolor coloring composition in an amount of from about 5% to about 40%, and most preferably in an amount of from about 20% to about 30% by weight of the overcolor coloring composition.

The overcolor marker inks also preferably contain an anti-oxidant. Typical anti-oxidants which may be employed in the overcolor marker ink coloring compositions include citric acid and phosphoric acid. The preferred anti-oxidant for use in the overcolor marker inks is citric acid. The anti-oxidant is usually present in the marker ink in an amount of from about 0.1% to about 3% by weight of the composition.

Low pH Overcolor Marker Ink Examples

| Component | Example 18 Blue Ink % | Example 19 Yellow Ink % | Example 20 Green Ink % |
|---|---|---|---|
| Deionized Water | 45.00 | 43.50 | 44.50 |
| Glycerin | 20.00 | 20.00 | 20.00 |
| Phosphoric Acid | 30.00 | 30.00 | 30.00 |
| Citric Acid | 1.00 | 1.00 | 1.00 |
| Preservative | | | |
| Nuosept 95 | 0.50 | 0.50 | 0.50 |
| premix | 2.50 | 2.50 | 2.50 |
| Acid Blue 93 | 1.00 | — | — |
| Acid Yellow 23 | — | 2.50 | — |
| Acid Green 3 | — | — | 1.50 |

| Component | Example 21 Pink Ink % | Example 22 Green Ink % | Example 23 Lt. Blue Ink % |
|---|---|---|---|
| Deionized Water | 45.50 | 43.50 | 45.75 |
| Glycerin | 20.00 | 20.00 | 20.00 |
| Phosphoric Acid | 30.00 | 30.00 | 30.00 |
| Citric Acid | 1.00 | 1.00 | 1.00 |
| Preservative | | | |
| Nuosept 95 | 0.50 | 0.50 | 0.50 |
| premix | 2.50 | 2.50 | 2.50 |
| Acid Violet 19 | 0.50 | — | — |
| Acid Yellow 23 | — | 2.00 | — |
| Acid Blue 93 | — | 0.50 | 0.25 |

The above percentages are by weight of the total compositions. The inks of examples 18–23 had acceptable working properties. For these examples, the pH of the inks ranged from 2.0 to 3.5 and the density ranged from 9.0 to 9.2 pounds per gallon. The viscosity of these inks ranged from 3.5 to 4.5 centipoise.

Two examples of low pH overcolor inks formulated using pigments are as follows. The pigments are available from Sinloihi Co., Japan. Percentages expressed are by weight of the total compositions.

| Component | Example 24 Red Ink % | Example 25 Green Ink % |
|---|---|---|
| Water | 50.0 | 45.0 |
| Glycerin | 5.0 | 5.0 |
| Phosphoric Acid | 30.0 | 30.0 |
| Pigment Dispersion (30%-40% pigment) | | |
| Fluorescent Scarlet SF-1013 | 15.0 | — |
| Fluorescent Green SF-1012 | — | 20.0 |

High pH/Reducing Agent System Marker Inks

The marker inks useful in a high pH/reducing agent system have been fully described in previous U.S. patent application Ser. Nos. 08/089,503, and 07/923,308, and related applications.

In general, the high pH system marker ink overcolor comprises a dye whose coloring ability is destroyed or modified in the presence of a pH of about 10 or greater and/or in the presence of a reducing agent. Most suitable for use as dyes in the undercolor coloring compositions are dyes that are easily destroyed by reducing agent. Such coloring compositions are commonly known in the field and are occasionally used as chemically "erasable" inks. Also suitable for use as dyes in the undercolor coloring compositions are dyes which are easily destroyed in the presence of a pH of about 10 or greater.

Especially suitable for use as dyes in the undercolor coloring composition are polymethine dyes, triphenylmethane dyes, cyanine dyes, methine dyes, and azo dyes which are unstable in the presence of a pH of about 10 or greater and/or are unstable in the presence of a reducing agent. Such dyes include the dyes marketed under the tradenames BASACRYL X-RL YELLOW™ (Basic Yellow 49), marketed by the BASF Corporation, ASTRAZON BLUE FRR™ (Basic Blue 69), ASTRAZON BRILLIANT RED 4G™ (Basic Red 14), and ASTRAZON PINK FBB™ (Basic Red 49) by Miles(Mobay); and the dyes marketed under the tradenames Acid Green 3 by International Dyestuffs Corporation, Acid Blue 93 and Acid Violet 19 marketed by Spectra Color Corporation as well as mixtures thereof.

The overcolor marker ink coloring composition in the high pH/reducing agent system is preferably formulated by combining a reducing agent and a base with a colorant which maintains its characteristic color in the presence of reducing agent and in high pH conditions. Of course, where colorants used in the undercolor composition are only affected by a reducing agent, the base may be deleted. Also, where dyes used in the undercolor composition are only affected by an elevated pH, the reducing agent may be eliminated. However, for maximum commercial application and for maximum effect upon a wider variety of undercolor compositions, the overcolor composition is preferably formulated with a reducing agent and base in combination.

Dyes which have been found to be suitable for use as colorants in the high pH/reducing agent system overcolor marker ink compositions include PYRANINE 120™ marketed by Miles(Mobay), Acid Red 52 marketed by Carolina Color, Food Red 14 marketed by Hilton-Davis, BASANTOL GREEN 910™ marketed by BASF, Acid Red 87 marketed by Hilton-Davis, Acid Red 92 marketed by International Dyestuffs Corporation, Acid Red 388 and Direct Blue 199 marketed by Crompton & Knowles, and mixtures thereof. Pigments may further be used as colorants in the high pH/reducing agent system overcolor marker ink compositions.

Typical reducing agents for use in the high pH/reducing agent system overcolor marker ink compositions include hydrogen sulfide, sodium sulfite, sodium hypochlorite, and hydrogen peroxide. The preferred reducing agent for use in the overcolor coloring composition of the invention is $Na_2SO_3$ (sodium sulfite). The reducing agent is generally present in the overcolor coloring composition of the invention in an amount from about 1% to about 20%.

Bases which may be used in the overcolor coloring composition in the high pH/reducing agent system overcolor marker ink compositions are typically strong bases, usually having a pH of from about 10 to about 12. Typical bases which may be employed in the overcolor coloring composition of the invention include ammonium hydroxide, sodium hydroxide, and sodium carbonate. The preferred base is sodium hydroxide. The base is generally present in the overcolor coloring composition of the invention in an amount from about 0.1% to about 10% by weight. Preferably, the base is added in an amount sufficient to raise the pH of the composition to a pH of from about 10 to about 12. The base should be contained in the overcolor coloring composition in an amount of from about 0.5% to about 8% by weight, and most preferably from about 1% to about 5% by weight, of the overcolor coloring composition.

COLORING SYSTEMS

The coloring systems of the present invention comprise an undercolor composition and an overcolor composition for changing the color of the undercolor composition, wherein at least one of the overcolor and undercolor compositions is a pan paint. Thus, for example, the coloring system may comprise a pan paint undercolor composition comprising a water-soluble solid carrier and a dye whose coloring ability is destroyed in the presence of a pH of about 10 or greater; and an overcolor composition comprising a colorant capable of maintaining its characteristic color in the presence of a pH of about 10 or greater and a base such that the pH of the overcolor composition is about 10 or greater. The coloring system may alternatively comprise an undercolor composition comprising a dye whose coloring ability is destroyed in the presence of a pH of about 10 or greater; and an overcolor pan paint composition comprising a colorant capable of maintaining its characteristic color in the presence of a pH of about 10 or greater and a base such that the pH of the overcolor composition is about 10 or greater and a water-soluble solid carrier.

Alternatively, the coloring system may comprise a pan paint undercolor composition comprising a water-soluble solid carrier and a dye whose coloring ability is destroyed in the presence of a pH of about 4 or less; and an overcolor composition comprising a colorant capable of maintaining its characteristic color in the presence of a pH of about 4 or less and an acid such that the pH of the overcolor composition is about 4 or less. Alternatively, the coloring system may comprise an undercolor composition comprising a dye whose coloring ability is destroyed in the presence of a pH of about 4 or less; and a pan paint overcolor composition comprising a water-soluble solid carrier, a dye that is capable of maintaining its characteristic color in the presence of a pH of about 4 or less, and an acid such that the pH of an aqueous solution of said overcolor pan paint composition is about 4 or less.

Any number of coloring compositions are useful in the coloring systems of the present invention. It is only necessary that one of the coloring compositions in the coloring system is a pan paint. Preferably, where a coloring composition other than a pan paint is used as an undercolor or an overcolor, the coloring composition is a marker ink. This is especially so where the undercolor is a high pH/reducing agent system pan paint undercolor composition. A pan paint may be used as an overcolor, as an undercolor, or as both an overcolor and an undercolor in the coloring systems of the present invention.

Preferably, though not necessarily, the undercolor composition is first applied to the substrate, followed by an application of the overcolor composition. A child may, however, also apply the overcolor coloring composition directly to the substrate. If an undercolor coloring composition is then used to overwrite the mark laid down by the overcolor coloring composition, the overcolor coloring composition will eliminate the color contributed by the undercolor coloring composition leaving only the color of the overcolor coloring composition where the mark was previously made. The undercolor color will be seen on other locations on the substrate not previously covered by the overcolor. This change will occur more slowly than when the overcolor coloring composition is applied over the undercolor coloring composition. This slowed reaction is presumably caused by the penetration of the overcolor coloring composition into the paper substrate. The child gains great play benefit by viewing this slowly disappearing color.

Typically, a child may make marks or color a picture using one or more pan paints of various colors on a suitable substrate, such as paper. The child may then select one or more pan paints containing various overcolor pan paint coloring compositions of the invention. The child may then over-paint a portion or all of the previously made markings eliminating the color of the undercolor pan paint coloring composition as applied and leaving only the color of the overcolor pan paint coloring composition used to overwrite the undercolor color composition. Because of the surprisingly strong and immediate impact of the overcolor pan paint coloring composition used to overwrite the undercolor pan paint coloring composition, the overcolor marker appears to paint a color over the undercolor on the portions of the substrate on which it is applied.

A child may also apply the overcolor pan paint coloring composition directly to the substrate. If an undercolor pan paint coloring composition is then used to overwrite the mark laid down by the overcolor pan paint coloring composition, the overcolor pan paint coloring composition will eliminate the color contributed by the undercolor pan paint coloring composition leaving only the color of the overcolor pan paint coloring composition where that mark was previously made. The undercolor color will be seen on other locations on the substrate. This change has been observed to occur more slowly than when the overcolor pan paint coloring composition is applied over the undercolor pan paint coloring composition. This slowed reaction is presumably caused by the penetration of the overcolor pan paint coloring composition into the paper substrate. The child gains great play benefit by viewing this slowly disappearing color.

In using the various above described overcolor pan paint coloring compositions and undercolor pan paint coloring compositions, a child could paint the undercolor blue coloring composition on paper, perhaps to paint the sky. If the child wishes to add in a yellow sun, a green tree growing up into the blue sky, and red flowers growing into the blue sky into the picture, the child may easily use the above-indicated overcolor coloring pan paint compositions to paint over the undercolor. Alternatively, if the child first paints a sun using the yellow overcolor pan paint coloring composition, he or she may paint in the sky using the blue undercolor ink right over the yellow without spoiling the colors.

Coloring System Examples

Example 26

Low pH System

The pan paint undercolor of Example 1 is used in conjunction with the pan paint overcolor of Example 4.

Example 27

Low pH System

The pan paint undercolor of Example 2 is used in conjunction with the pan paint overcolors of Examples 3, 4, and 5, and with the marker ink overcolor of Example 18.

Example 28

Low pH System

The marker ink undercolor of Example 14 is used in conjunction with the pan paint overcolor of Example 5.

Example 29

High pH System

The pan paint undercolor of Example 6 is used in conjunction with the pan paint overcolor of Example 10.

Example 30

High pH System

The pan paint undercolor of Example 9 is used in conjunction with the pan paint overcolor of Examples 11–13 and with a marker ink overwriter composition as disclosed in U.S. patent application Ser. No. 08/089,503.

Example 31

High pH System

A marker ink underwriter composition as disclosed in U.S. patent application Ser. No. 08/089,503 is used in conjunction with the pan paint overcolor of Example 12.

From the foregoing description and examples, it is apparent that the objects of the present invention have been achieved. While only certain embodiments have been set forth, alternative embodiments and various modifications will be apparent to those skilled in the art. These and other alternatives are considered equivalents and within the spirit and scope of the present invention. All references and previous applications cited herein are hereby incorporated by reference in their entireties.

What is claimed is:

1. A pan paint composition comprising by weight:

from about 20% to about 99.9% of a water-soluble resin; and from about 0.1% to about 20% of a water-soluble dye selected from the group consisting of dyes whose coloring ability is destroyed or modified in the presence of a pH of about 10 or more; dyes whose coloring ability is destroyed or modified in the presence of a reducing agent; and dyes whose coloring ability is destroyed or modified in the presence of a pH of about 10 or more and in the presence of a reducing agent.

2. A pan paint composition according to claim 1, comprising by weight:

from about 20% to about 99.9% of a water-soluble resin;

a plasticizer or nucleating agent in a total amount in the range of 0% to about 40%;

from 0% to about 15% water;

from 0% to about 20% of an opacifier;

from 0% to about 25% of a filler;

from 0% to about 10% of a surfactant;

from 0% to about 5% of a preservative;

from 0% to about 1% of a defoamer;

from 0% to about 30% of a pigment; and from about 0.1% to about 20% of a water-soluble dye selected from the group consisting of dyes whose coloring ability is destroyed or modified in the presence of a pH of about 10 or more; dyes whose coloring ability is destroyed or modified in the presence of a reducing agent; and dyes whose coloring ability is destroyed or modified in the presence of a pH of about 10 or more and in the presence of a reducing agent.

3. A pan paint composition comprising by weight:

from about 20% to about 99.9% of a water-soluble resin; and from about 0.1% to about 20% of a water-soluble dye whose coloring ability is destroyed or modified in the presence of a pH of about 4 or less.

4. A pan paint composition according to claim 3, comprising by weight:

from about 20% to about 99.9% of a water-soluble resin;

a plasticizer or nucleating agent in a total amount in the range of 0% to about 40%;

from 0% to about 15% water;

from 0% to about 20% of an opacifier;

from 0% to about 25% of a filler;

from 0% to about 10% of a surfactant;

from 0% to about 5% of a preservative;

from about 0% to about 1% of a defoamer;

from 0% to about 30% of a pigment;

from 0% to about 5% of a stabilizing base; and from about 0.1% to about 20% of a water-soluble dye whose coloring ability is destroyed or modified in the presence of a pH of about 4 or less.

5. A pan paint composition comprising by weight:

from about 20% to about 99.4% of a water-soluble resin;

from 0% to about 30% of a pigment;

from 0% to about 10% of a base;

from 0% to about 20% of a reducing agent, provided that the total amount of base and reducing agent taken together is at least 0.5%; and from 0% to about 20% of a dye whose coloring ability is not destroyed or modified in the presence of a pH of about 10 or more, provided that the total amount of colorant in the pan paint composition is at least 0.1%.

6. A pan paint composition according to claim 5, comprising by weight:

from about 20% to about 99.4% of a water-soluble resin;

a plasticizer or nucleating agent in a total amount in the range of 0% to about 40%;

from 0 to about 15% water;

from 0% to about 20% of an opacifier;

from 0% to 25% of a filler;

from 0% to about 10% of a surfactant;

from 0% to about 5% of a preservative;

from 0% to about 1% of a defoamer;

from 0% to about 30% of a pigment;

from 0% to about 10% of a base;

from 0% to about 20% of a reducing agent, provided that the total amount of base and reducing agent taken together is at least 0.5%; and from 0% to about 20% of a dye whose coloring ability is not destroyed or modified in the presence of a pH of about 10 or more, provided that the total amount of colorant in the pan paint composition is at least 0.1%.

7. A pan paint composition comprising by weight:

from about 20% to about 99.4% of a water-soluble resin;

from 0% to about 30% of a pigment;

from about 0.5% to about 30% of an acid; and from 0% to about 20% of a dye whose coloring ability is not destroyed or modified in the presence of a pH of about 4 or less, provided that the total amount of colorant in the pan paint composition is at least 0.1%.

8. A pan paint composition according to claim 7, comprising by weight:

from about 20% to about 99.4% of a water-soluble resin;

a plasticizer or nucleating agent in a total amount in the range of 0% to about 40%;

from 0% to about 15% water;

from 0% to about 20% of an opacifier;

from 0% to about 25% of a filler;

from 0% to about 10% of a surfactant;

from 0% to about 5% of a preservative;

from 0% to about 1% of a defoamer;

from 0% to about 30% of a pigment;

from about 0.5% to about 30% of an acid;

from 0% to about 3% of an antioxidant; and from 0% to about 20% of a dye whose coloring ability is not destroyed or modified in the presence of a pH of about 4 or less, provided that the total amount of colorant in the pan paint composition is at least 0.1%.

9. A coloring system comprising:

a pan paint undercolor composition comprising a water-soluble solid carrier and a dye whose coloring ability is destroyed in the presence of a pH of about 10 or greater; and an overcolor composition comprising a colorant capable of maintaining its characteristic color in the presence of a pH of about 10 or greater and a base such that the pH of the overcolor composition is about 10 or greater.

10. A coloring system according to claim 9, wherein said water-soluble carrier comprises a water-soluble resin selected from the group consisting of modified starches, water-soluble gums, water-soluble waxes, hydroxyethylcellulose, carboxyethylcellulose, ethylene oxide polymers, polyacrylic acid, and polyacrylamide.

11. A coloring system according to claim 9, wherein said overcolor composition is an ink.

12. A coloring system according to claim 10, wherein said resin is polyethylene glycol.

13. A coloring system according to claim 12, wherein said water-soluble carrier further comprises an opacifier.

14. A coloring system according to claim 13, wherein said opacifier is selected from the group consisting of barium sulfate and titanium dioxide.

15. A coloring system according to claim 12, wherein said water-soluble carrier further comprises a preservative.

16. A coloring system according to claim 12, wherein said water-soluble carrier further comprises a plasticizer.

17. A coloring system according to claim 16, wherein said plasticizer is selected from the group consisting of stearyl alcohol and a polyethelthene glycol having a molecular weight of about 20,000.

18. A coloring system according to claim 12, wherein said water-soluble carrier further comprises a surfactant.

19. A coloring system according to claim 18, wherein said surfactant is poly(oxy-1,2-ethanediyl), alpha-(nonylPhenyl)-omega-hydroxy-, branched.

20. A coloring system according to claim 9, wherein said overcolor composition is a pan paint composition comprising said colorant and a water-soluble carrier.

21. A coloring system according to claim 9, wherein said overcolor composition is an ink composition comprising said colorant and an aqueous carrier.

22. A coloring system comprising:
an undercolor composition comprising a dye whose coloring ability is destroyed in the presence of a pH of about 10 or greater; and
an overcolor pan paint composition comprising a colorant capable of maintaining its characteristic color in the presence of a pH of about 10 or greater and a base such that the pH of the overcolor composition is about 10 or greater and a water-soluble solid carrier.

23. A coloring system according to claim 22, wherein said water-soluble carrier comprises a water-soluble resin selected from the group consisting of modified starches, water-soluble gums, water-soluble waxes, hydroxyethylcellulose, carboxyethylcellulose, ethylene oxide polymers, polyacrylic acid, and polyacrylamide.

24. A coloring system according to claim 23, wherein said resin is polyethylene glycol.

25. A coloring system according to claim 24, wherein said water-soluble carrier further comprises an opacifier.

26. A coloring system according to claim 25, wherein said opacifier is selected from the group consisting of barium sulfate and titanium dioxide.

27. A coloring system according to claim 24, wherein said water-soluble carrier further comprises a preservative.

28. A coloring system according to claim 24, wherein said water-soluble carrier further comprises a plasticizer.

29. A coloring system according to claim 28, wherein said plasticizer is selected from the group consisting of stearyl alcohol and a polyethelthene glycol having a molecular weight of about 20,000.

30. A coloring system according to claim 24, wherein said water-soluble carrier further comprises a surfactant.

31. A coloring system according to claim 30, wherein said surfactant is poly(oxy-1,2-ethanediyl), alpha-(nonylPhenyl)-omega-hydroxy-, branched.

32. A coloring system according to claim 22, wherein said undercolor composition is an ink composition comprising said colorant and an aqueous carrier.

33. A coloring system comprising:
a pan paint undercolor composition comprising a water-soluble solid carrier and a dye whose coloring ability is destroyed in the presence of a pH of about 4 or less; and
an overcolor composition comprising a colorant capable of maintaining its characteristic color in the presence of a pH of about 4 or less and an acid such that the pH of the overcolor composition is about 4 or less.

34. A coloring system according to claim 33, wherein said water-soluble carrier comprises a water-soluble resin selected from the group consisting of modified starches, water-soluble gums, water-soluble waxes, hydroxyethylcellulose, carboxyethylcellulose, ethylene oxide polymers, polyacrylic acid, and polyacrylamide.

35. A coloring system according to claim 34, wherein said resin is polyethylene glycol.

36. A coloring system according to claim 35, wherein said water-soluble carrier further comprises an opacifier.

37. A coloring system according to claim 36, wherein said opacifier is selected from the group consisting of barium sulfate and titanium dioxide.

38. A coloring system according to claim 35, wherein said water-soluble carrier further comprises a preservative.

39. A coloring system according to claim 35, wherein said water-soluble carrier further comprises a plasticizer.

40. A coloring system according to claim 39, wherein said plasticizer is selected from the group consisting of stearyl alcohol and a polyethelthene glycol having a molecular weight of about 20,000.

41. A coloring system according to claim 35, wherein said water-soluble carrier further comprises a surfactant.

42. A coloring system according to claim 41, wherein said surfactant is poly(oxy-1,2-ethanediyl), alpha-(nonylPhenyl)-omega-hydroxy-, branched.

43. A coloring system according to claim 33, wherein said overcolor composition is a pan paint composition comprising said colorant and a water-soluble carrier.

44. A coloring system according to claim 33, wherein said overcolor composition is an ink composition comprising said colorant and an aqueous carrier.

45. A coloring system comprising:
an undercolor composition comprising a dye whose coloring ability is destroyed in the presence of a pH of about 4 or less; and
a pan paint overcolor composition comprising a water-soluble solid carrier, a dye that is capable of maintaining its characteristic color in the presence of a pH of about 4 or less, and an acid such that the pH of an aqueous solution of said overcolor pan paint composition is about 4 or less.

46. A coloring system according to claim 45, wherein said water-soluble carrier comprises a water-soluble resin selected from the group consisting of modified starches, water-soluble gums, water-soluble waxes, hydroxyethylcellulose, carboxyethylcellulose, ethylene oxide polymers, polyacrylic acid, and polyacrylamide.

47. A coloring system according to claim 46, wherein said resin is polyethylene glycol.

48. A coloring system according to claim 47, wherein said water-soluble carrier further comprises an opacifier.

49. A coloring system according to claim 48, wherein said opacifier is selected from the group consisting of barium sulfate and titanium dioxide.

50. A coloring system according to claim 47, wherein said water-soluble carrier further comprises a preservative.

51. A coloring system according to claim 47, wherein said water-soluble carrier further comprises a plasticizer.

52. A coloring system according to claim 51, wherein said plasticizer is selected from the group consisting of stearyl alcohol and a polyethelthene glycol having a molecular weight of about 20,000.

53. A coloring system according to claim 47, wherein said water-soluble carrier further comprises a surfactant.

54. A coloring system according to claim 53, wherein said surfactant is poly(oxy-1,2-ethanediyl), alpha-(nonylPhenyl)-omega-hydroxy-, branched.

55. A coloring system according to claim 45, wherein said undercolor composition is an ink composition comprising said colorant and an aqueous carrier.

56. A coloring system comprising by weight:
a pan paint undercolor composition comprising a water-soluble solid carrier and a dye selected from the group consisting of dyes whose coloring ability is destroyed or modified in the presence of a pH of about 10 or more; dyes whose coloring ability is destroyed or modified in the presence of a reducing agent; and dyes whose coloring ability is destroyed or modified in the presence of a pH of about 10 or more and in the presence of a reducing agent; and
an overcolor composition comprising a colorant capable of maintaining its characteristic color in the presence of a pH of about 10 or greater and in the presence of a reducing agent, from 0% to about 20% of a reducing agent, and from 0% to about 10% of a base, provided that the total amount of base and reducing agent, taken together, is at least 0.5%.

57. A coloring system comprising by weight:

an undercolor composition comprising a dye selected from the group consisting of dyes whose coloring ability is destroyed or modified in the presence of a pH of about 10 or more; dyes whose coloring ability is destroyed or modified in the presence of a reducing agent; and dyes whose coloring ability is destroyed or modified in the presence of a pH of about 10 or more and in the presence of a reducing agent; and a pan paint overcolor composition comprising a water-soluble solid carrier and a colorant capable of maintaining its characteristic color in the presence of a pH of about 10 or greater and in the presence of a reducing agent, from 0% to about 20% of a reducing agent, and from 0% to about 10% of a base, provided that the total amount of base and reducing agent, taken together, is at least 0.5%.

* * * * *